(12) United States Patent
Olund et al.

(10) Patent No.: US 12,017,388 B2
(45) Date of Patent: *Jun. 25, 2024

(54) LENS CASTING SYSTEM

(71) Applicant: HOYA Optical Labs of America, Inc., Lewisville, TX (US)

(72) Inventors: David Olund, Ramsey, MN (US); Sarawuth Seewattanangkoon, Ramsey, MN (US); Hannah Vu, Ramsey, MN (US); Ladawan Chantharadet, Ramsey, MN (US); Pasin Pudsayapong, Ramsey, MN (US); Harjit Bhambra, Ramsey, MN (US); Jeff Brown, Ramsey, MN (US); Richard Blacker, Ramsey, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 469 days.

This patent is subject to a terminal disclaimer.

(21) Appl. No.: 17/155,755

(22) Filed: Jan. 22, 2021

(65) Prior Publication Data

US 2021/0138694 A1 May 13, 2021

Related U.S. Application Data

(63) Continuation of application No. 15/379,287, filed on Dec. 14, 2016, now Pat. No. 10,926,434.

(60) Provisional application No. 62/267,178, filed on Dec. 14, 2015.

(51) Int. Cl.
*B29C 39/00* (2006.01)
*B29C 33/12* (2006.01)
*B29D 11/00* (2006.01)
*G02B 1/10* (2015.01)
(Continued)

(52) U.S. Cl.
CPC ............ *B29C 39/003* (2013.01); *B29C 33/12* (2013.01); *B29D 11/00009* (2013.01); *B29D 11/00528* (2013.01); *G02B 1/10* (2013.01); *B29C 33/0038* (2013.01); *B29C 33/0077* (2013.01); *B29C 39/10* (2013.01)

(58) Field of Classification Search
CPC ....... B29C 39/003; B29C 39/10; B29C 33/12; B29D 11/00528; B29D 11/00009; G02B 1/10
See application file for complete search history.

(56) References Cited

U.S. PATENT DOCUMENTS

| 4,227,673 A | 10/1980 | Goodwin et al. |
| 4,693,446 A | 9/1987 | Orlosky |
| 5,286,419 A | 2/1994 | van Ligten et al. |

(Continued)

FOREIGN PATENT DOCUMENTS

CN 1401472 A 3/2003

OTHER PUBLICATIONS

Chinese Patent Office, Office Action dated Feb. 25, 2020 with English translation in Chinese Patent Application No. 201680080116.8, 10 pages.

(Continued)

*Primary Examiner* — Mathieu D Vargot
(74) *Attorney, Agent, or Firm* — Inskeep IP Group, Inc.

(57) ABSTRACT

An optical lens casting gasket, wafer, and system and method that provides for more efficient formation of optical lenses employing optically functional wafers.

19 Claims, 18 Drawing Sheets

(51) Int. Cl.
 *B29C 33/00* (2006.01)
 *B29C 39/10* (2006.01)

(56) References Cited

U.S. PATENT DOCUMENTS

| | | |
|---|---|---|
| 6,391,231 B1 | 5/2002 | Evans et al. |
| 10,926,434 B2 * | 2/2021 | Olund .............. B29D 11/00528 |
| 2002/0047220 A1 | 4/2002 | Su |
| 2006/0103037 A1 | 5/2006 | Su et al. |
| 2015/0226880 A1 | 8/2015 | Blacker et al. |

OTHER PUBLICATIONS

WIPO, U.S. International Search Authority, International Search Report and Written Opinion dated Apr. 4, 2017 in International Patent Application No. PCT/US2016/066695, 10 pages.

* cited by examiner

Prior Art

SECTION A-A

DETAIL B

DETAIL F

DETAIL D

SECTION B-B

LENS CASTING SYSTEM

RELATED APPLICATIONS

This application is a continuation of and claims priority to U.S. patent application Ser. No. 15/379,287 filed Dec. 14, 2016, now U.S. Pat. No. 10,926,434, entitled Lens Casting System, which claims benefit of and priority to U.S. Provisional Application Ser. No. 62/267,178 filed Dec. 14, 2015, entitled Lens Casting System, both of which are hereby incorporated herein by reference in their entireties.

FIELD OF THE INVENTION

The present invention relates to ophthalmic lenses and, more particularly, to the formation of cast ophthalmic lenses employing functional inserts or wafers.

BACKGROUND OF THE INVENTION

Cast ophthalmic lenses employing optically functional characteristics in addition to vision correction or enhancement characteristics are increasingly common in the market place. Such functional characteristics may include polarization, tinting or coloration, and photochromism. Cast polarizing ophthalmic lenses, for example, are formed by placing or inserting a polyvinyl alcohol, PVA, or polyethylene terephthalate, PET, polarizing sheet into a cast monomer lens. Polarizing PVA sheeting is manufactured by stretching a PVA sheet that has been doped with a dichroic dye, for example, iodine. The stretching serves to align the polymer molecules, and thus gives the dichroic dye used to impart the polarization effect an alignment anchor. The resulting mono-axially stretched PVA film typically has a thickness in the order of 30 to 40 micrometers and, hence, is mechanically weak. The PVA film is easily torn in the stretched or alignment direction and can be distorted by relatively minor external forces such as the breath of a person handling the film.

Known techniques for forming polarizing ophthalmic cast lenses involve the cutting and forming of the polarizing PVA sheet into a circular form, referred to as a polarizing wafer, sized for insertion into a lens casting gasket. As shown in FIGS. 1A-1C, a typical lens casting gasket 10 is a hollow cylinder employing various internal features in the form of continuous or uninterrupted rims or circular protrusions extending from an interior side wall of the gasket into an interior volume of the gasket. During formation of a polarizing ophthalmic lens, a technician first inserts the circular PVA polarizing wafer into a groove 12. Insertion is achieved by distorting the shape of the wafer and careful manipulation of the outer periphery of the wafer into the groove 12. Due to the inherent weakness of the PVA wafer, this is a delicate, time consuming, and skilled manual process.

Next, front and back lens surface molds formed of, for example glass, are inserted into the respective sides of the gasket. A front convex lens surface mold is inserted into the interior of the gasket 10 against a front rim 14 and a back concave lens surface mold is inserted into the interior of the gasket 10 against a back rim 16. With the wafer and mold surfaces assembled within the gasket 10, a curable casting composition or monomer is introduced into one of ports 18. Ultimately, the introduced curable casting composition or monomer must fill the internal portion of the gasket between a back side of the wafer and the back lens mold surface and the internal portion of the gasket between a front side of the wafer and the front lens mold surface.

In view of the location of the ports 18, in order for the curable casting composition or monomer to fill the internal portion of the gasket between the front side of the wafer and the front mold surface without distortion of the wafer within the gasket, the curable casting composition or monomer must flow around the periphery of the wafer inserted within the groove 12. Due to the fragility of the wafer, introduction of the curable casting composition or monomer into the casket must be highly controlled to minimize pressure exerted against the surfaces of the wafer and thereby minimize distortion of the wafer within the gasket. Once the gasket is filled with the curable casting composition or monomer, the curable casting composition or monomer is cured to form the cast lens, for example through ultraviolet or thermal curing.

The highly controlled introduction of the curable casting composition or monomer requires a significantly slow flow of the curable casting composition or monomer into the gasket which results in the overall casting process requiring a large investment in time relative to the quantity of lenses produced.

What is needed in the art is a casting process and assembly that provides for a greater lens yield in a shorter amount of time. What is further needed in the art is a casting process and assembly that reduces manual manipulation of delicate wafers and thus increases throughput by minimizing process generated wafer/lens imperfections.

OBJECTS AND SUMMARY OF THE INVENTION

The casting system of the present invention provides a casting process and assembly that allows for greater lens yield in a shorter amount of time and, in certain embodiments, reduces manual manipulation of delicate wafers and thus increases throughput by minimizing process generated wafer/lens imperfections. These objectives are achieved, in part, by providing an optical lens casting gasket comprising: a body having a cylindrical shape; a groove formed circumferentially around in an interior surface of the body; a fill port formed through a sidewall of the body; and a vent port formed through a sidewall of the body that intersects the groove. In certain embodiments, the fill port is formed through a sidewall of the body between the groove and a back mold stop. In certain embodiments, the groove is tapered. In certain embodiments, the fill port comprises a tubular element extending from an exterior surface of the body. In certain embodiments, the gasket further comprises a chamber in fluid communication with the vent port formed on an exterior of the body.

These objectives are further achieved, in part, by providing an optically functional wafer comprising: a periphery having a first portion and a second portion distinct from the first portion; and an optically functional property; the first portion forming a continuous curve with a first radius; the second portion forming at least one of a straight segment or a curve with a second radius distinct from the first radius. In certain embodiments, the optical functional property is selected from the groups consisting of: polarization, photochromism, tint, color, hardness, chemical resistance, and reflectance. In certain embodiments, the periphery is non-circular shaped. In certain embodiments, the wafer further comprises a laminate structure. In certain embodiments, the second portion comprises five straight segments.

These objectives are further achieved, in part, by providing an optical lens casting system comprising: a cylindrical gasket comprising: a groove formed circumferentially around in an interior surface of the cylindrical gasket; and a vent port formed through a sidewall of the cylindrical gasket that intersects the groove; and an optically functional wafer comprising: the first portion forming a continuous curve with a first radius; the second portion forming at least one of a straight segment or a curve with a second radius distinct from the first radius; the optically functional wafer positioned within the groove with the first portion of the wafer covering the vent port of the gasket. In certain embodiments, the vent port has an oval cross-section. In certain embodiments, the system further comprises a fill port formed through a sidewall of the gasket between the groove and a back mold stop. In certain embodiments, the groove is tapered. In certain embodiments, the optically functional wafer comprises five straight segments.

These objectives are further achieved, in part, by providing a method of forming a cast optical lens comprising: inserting an optically functional wafer into a groove formed circumferentially around in an interior surface of a cylindrical gasket; orienting a periphery of the optically functional wafer to cover a vent port formed through a sidewall of the gasket; inserting a front and back mold surface into the gasket; filling an interior volume of the gasket with a curable composition; and curing the curable composition. In certain embodiments, inserting an optically functional wafer into a groove formed circumferentially around in an interior surface of a cylindrical gasket comprises inserting a non-circular wafer into the groove. In certain embodiments, orienting a periphery of the optically functional wafer to cover a vent port formed through a sidewall of the gasket comprises orienting a curved portion of the wafer to cover the vent port. In certain embodiments, filling an interior volume of the gasket with a curable composition comprises filling the interior volume of the gasket through a fill port formed through a sidewall of the gasket between the groove and a back mold stop. In certain embodiments, curing the curable composition comprises curing a urethane based prepolymer composition.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1A:
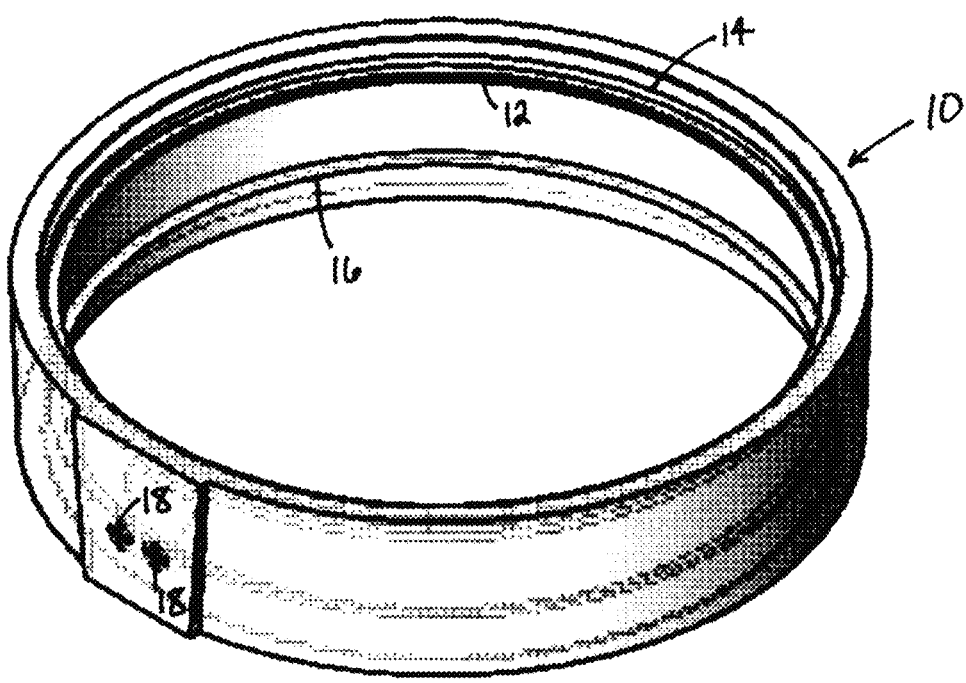
FIG. 1A is a perspective view of a lens casting gasket.
Figure 1B:
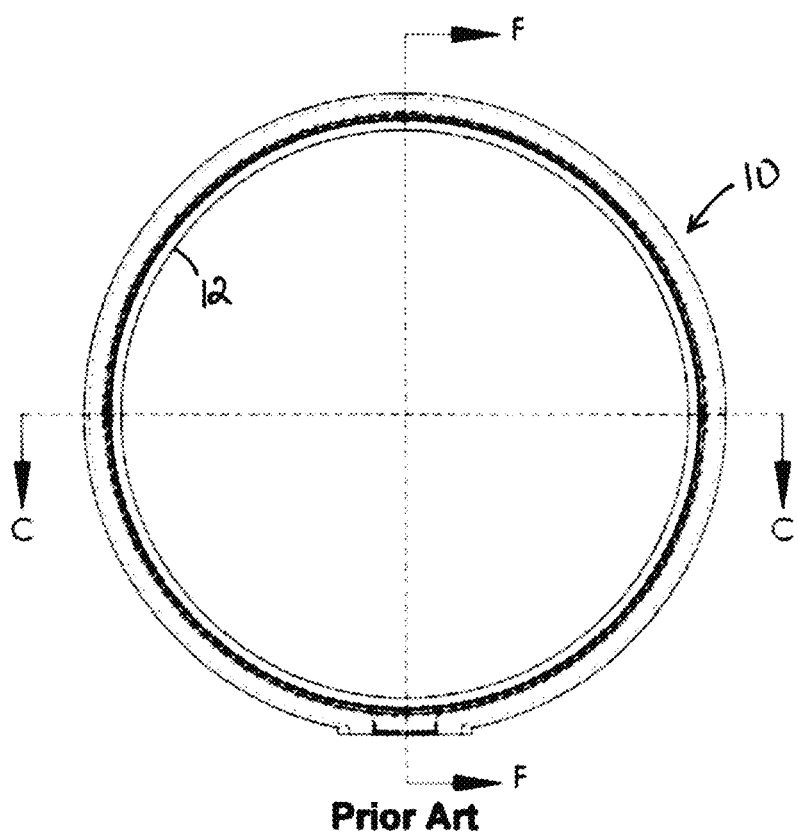
FIG. 1B is a plan view of a lens casting gasket.
Figure 1C:
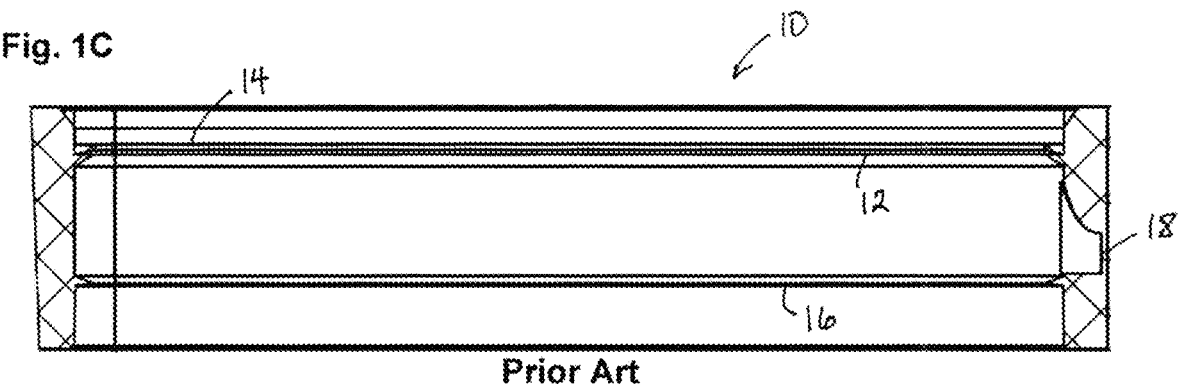
FIG. 1C is a cross-sectional view along line F shown in FIG. 1B of a lens casting gasket.
Figure 2:
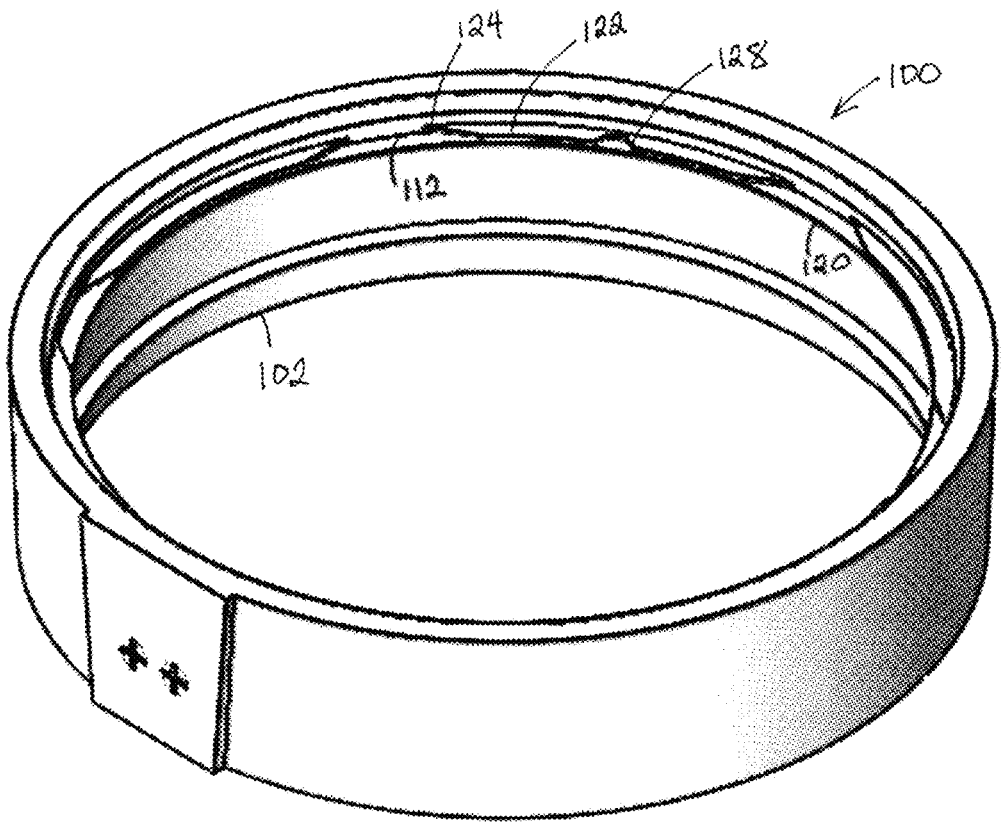
FIG. 2 is a perspective view of a lens casting gasket according to one embodiment of the present invention.
Figure 3:
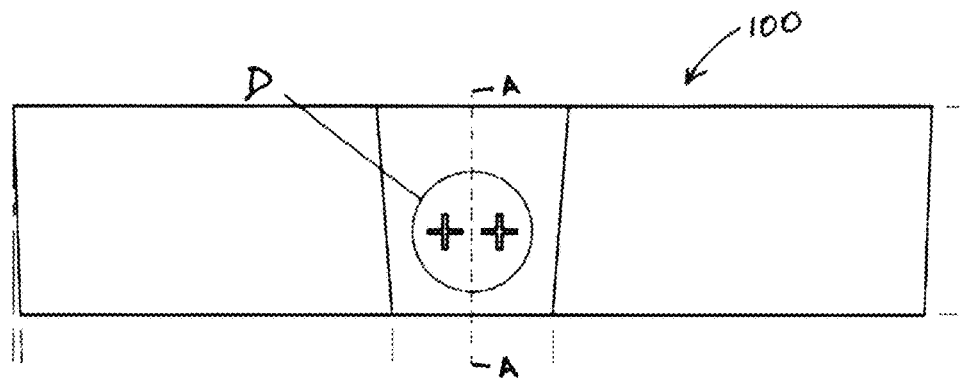
FIG. 3 is a front elevation view of a lens casting gasket according to one embodiment of the present invention.
Figure 4:
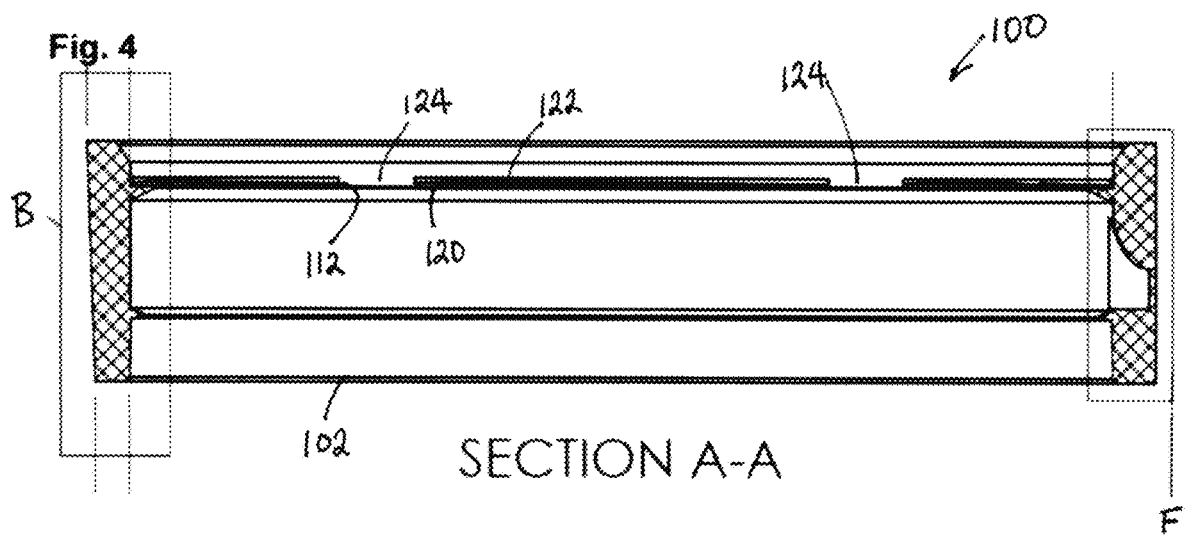
FIG. 4 is a cross-sectional view along line A shown in FIG. 3 of a lens casting gasket according to one embodiment of the present invention.
Figure 5:
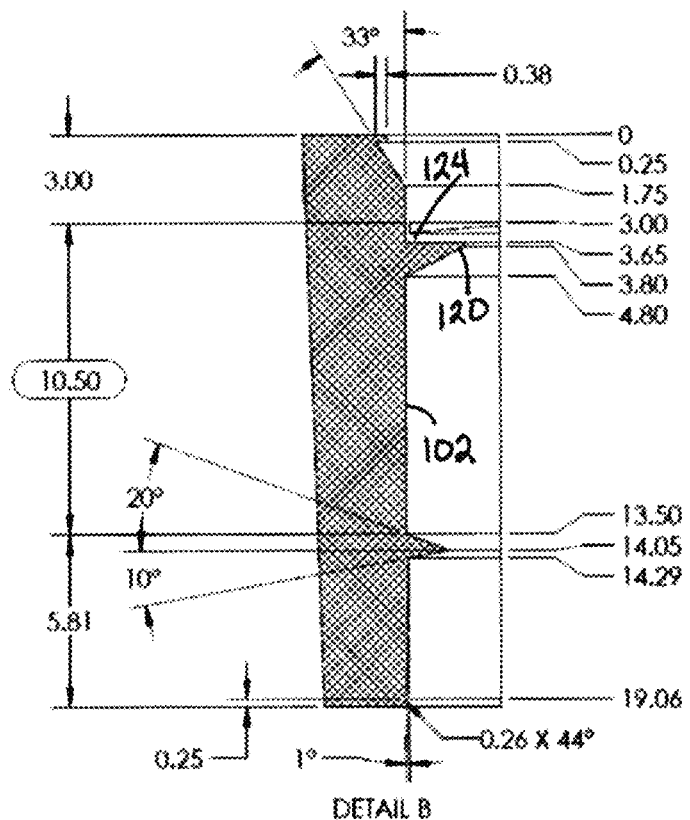
FIG. 5 is a detailed view of area B shown in FIG. 4 of a lens casting gasket according to one embodiment of the present invention.
Figure 6:
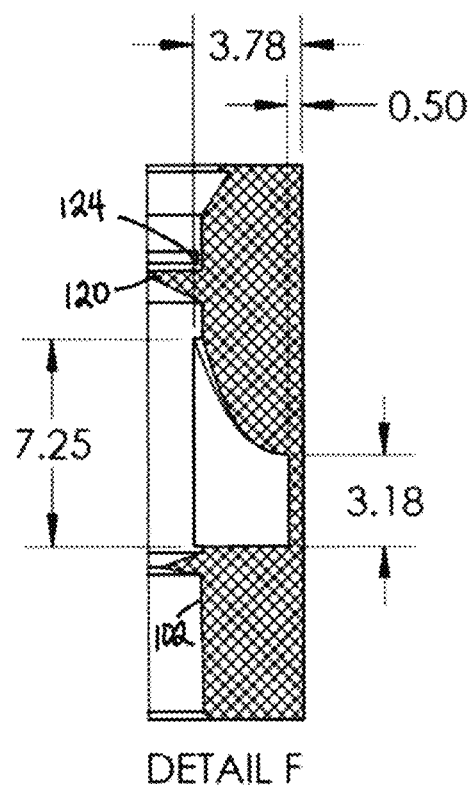
FIG. 6 is a detailed view of area F shown in FIG. 4 of a lens casting gasket according to one embodiment of the present invention.
Figure 7:
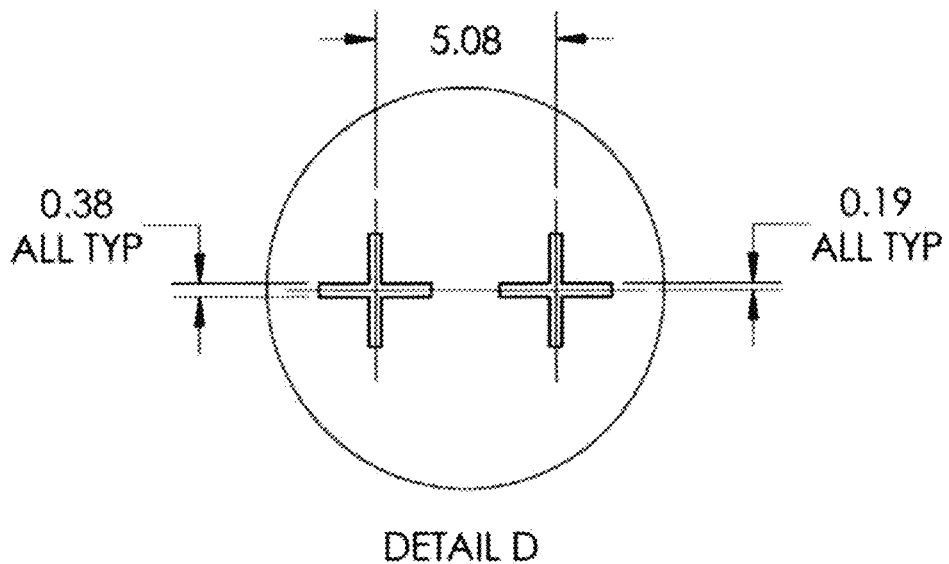
FIG. 7 is a detailed view of area D shown in FIG. 3 of a lens casting gasket according to one embodiment of the present invention.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Broadly speaking the present invention provides a casting system and method that employs a casting assembly or gasket that allows for more efficient manual and/or automated loading of optically functional wafers. In certain embodiments of the present invention, the inventive casting assembly is configured to accept wafers having a circular or a non-circular shape. The benefits and improvements achieved by the casting assembly of the present invention may be enhanced by employing complementary, non-circular shaped wafers that allow for greater ease of loading into the gasket and/or better flow of the casting monomer around the wafer inserted within the gasket.

Figure 11:
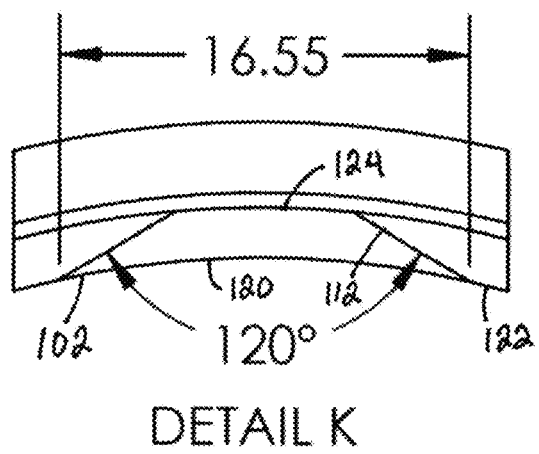
FIG. 11 is a detailed view of area K shown in FIG. 8 of a lens casting gasket according to one embodiment of the present invention.

As shown in FIGS. 2-13, in certain embodiments of the present invention, a cylindrical gasket 100 employs a groove 112. The groove 112 is formed circumferentially within an interior of the gasket 100 between a lower lip 120 and an upper lip 122 that protrude from an interior sidewall 102 of the gasket 100. The lower lip 120 forms a substantially continuous and/or uniform protrusion from the interior sidewall 102 of the gasket 100. The upper lip 122 forms an interrupted protrusion from an interior sidewall 102 of the gasket 100. FIG. 11 shows a cutout 124 exemplifying one form of the discontinuity or interruptions of the upper lip 122. The interrupted form of upper lip 122 may additionally include asymmetric notches 126 and 128. The notch 126, for example, has a larger width than a width of the notch 128.

Figure 8:
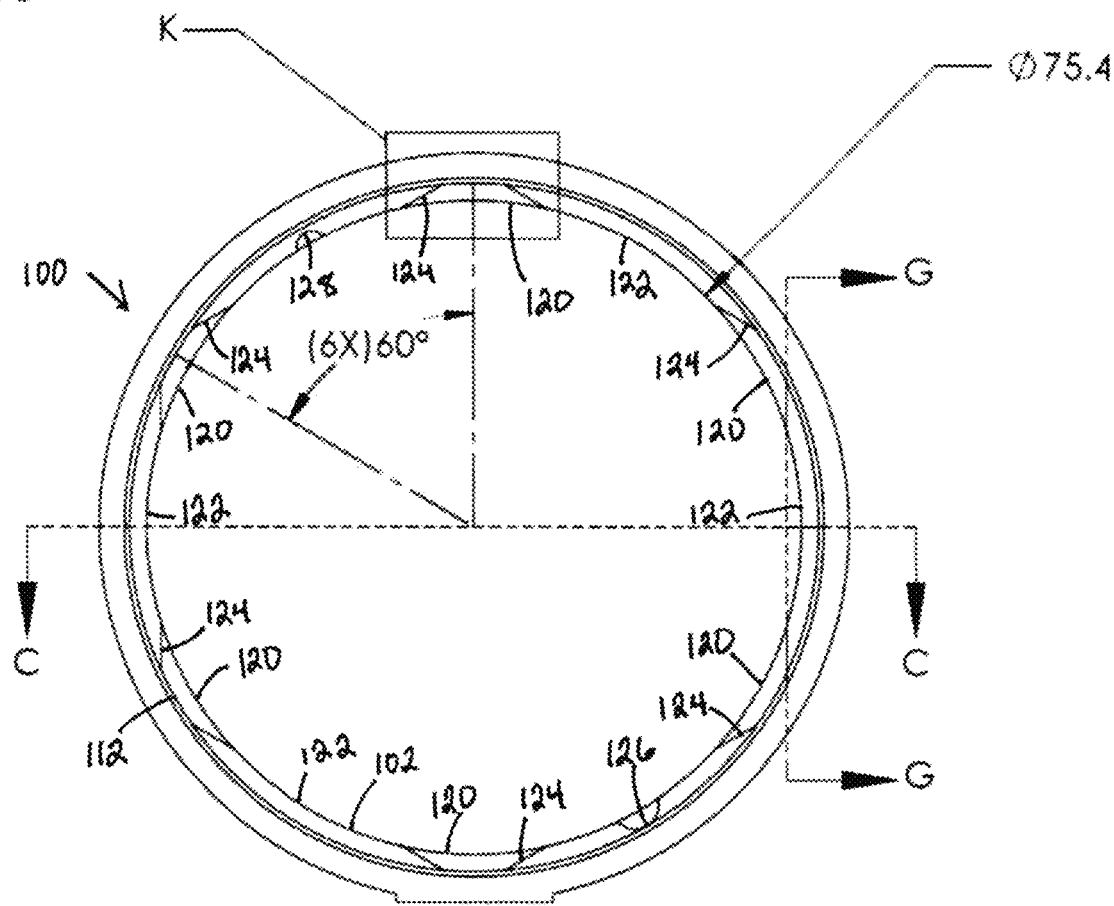
FIG. 8 is a plan view of a lens casting gasket according to one embodiment of the present invention.
Figure 9:
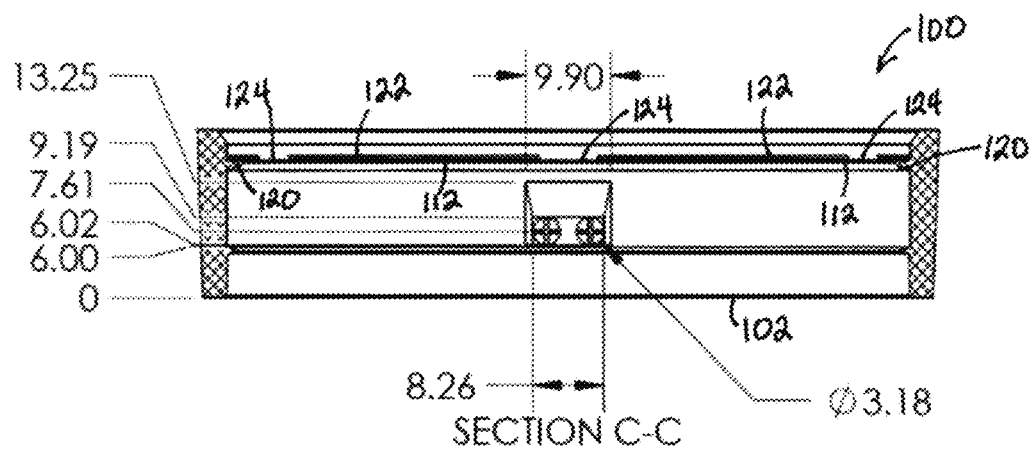
FIG. 9 is a cross-sectional view along line C shown in FIG. 8 of a lens casting gasket according to one embodiment of the present invention.
Figure 10:
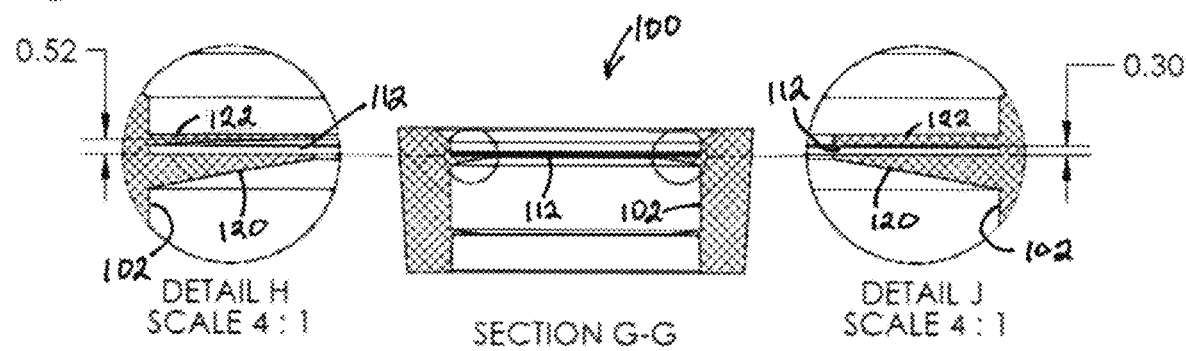
FIG. 10 is a cross-sectional view along line G shown in FIG. 8 and detailed views of a lens casting gasket according to one embodiment of the present invention.
Figure 12:
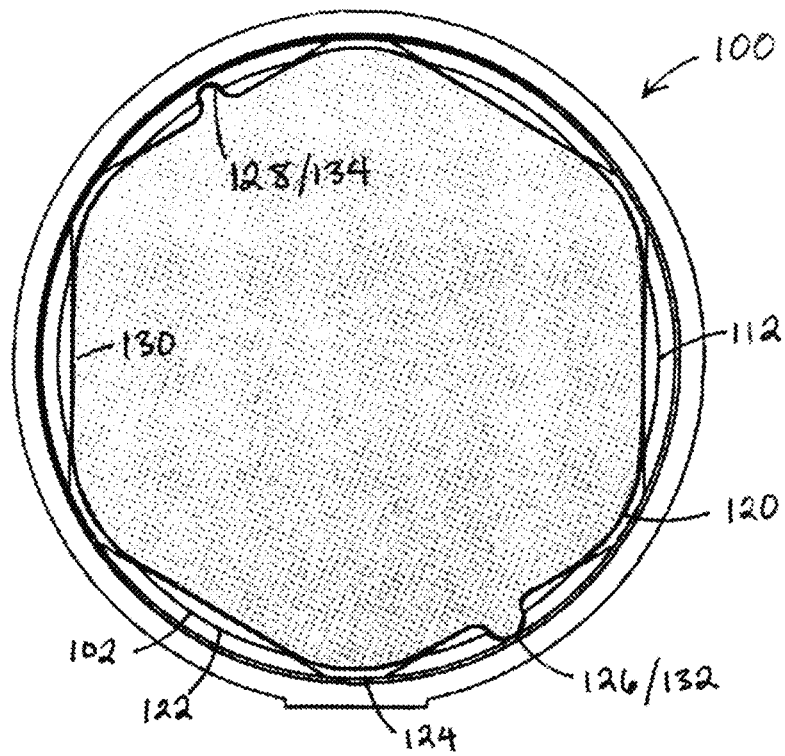
FIG. 12 is a plan view of a functional wafer initially loaded into a lens casting gasket according to one embodiment of the present invention.
Figure 13:
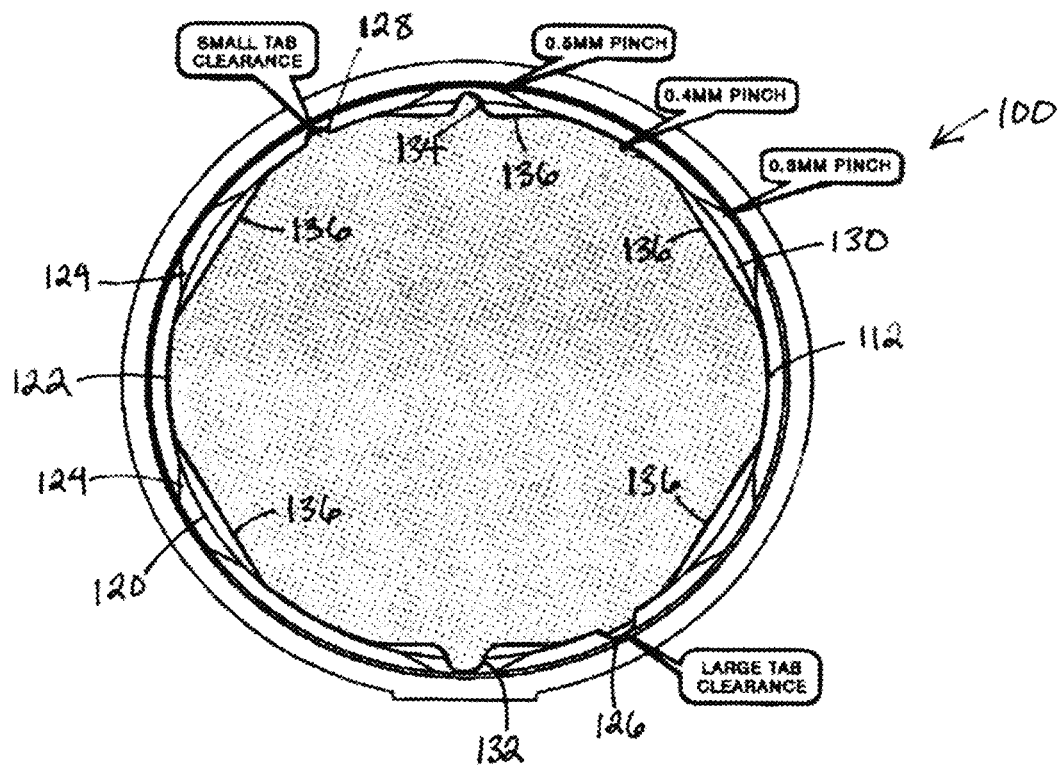
FIG. 13 is a plan view of a functional wafer secured within a lens casting gasket by rotation of the wafer within the gasket according to one embodiment of the present invention.

As shown in FIGS. 8, 12, and 13, the overall or general shape defined by the upper lip 122 is, for example, a hexagon. However, the hexagonal shape defined by the upper lip 122 in the accompanying figures is only one example of a gasket 100, the upper lip 122 of the gasket 100 may define other non-circular shapes complementary to the below-described functional wafers.

In certain embodiments of the casting system of the present invention, the non-circular shape defined by the upper lip 122 of the gasket 100 is complementary to the shape and size of an optically functional wafer employed in the gasket 100 during formation of a cast lens. For example, with respect to the embodiment of the present invention shown in FIGS. 2-13, a functional wafer 130 employed has a form in the general shape of a hexagon. The hexagonal wafer 130, shown as shaded in FIG. 12, and certain advantages of such are described in greater detail in the Assignee's U.S. patent application Ser. No. 14/616,606, the contents of which are herein incorporated by reference. As shown in FIGS. 24-33 and described in greater detail below, in certain embodiments of the present invention, functional wafers employing circular shapes, oval shapes, rectangular shapes such as a strip-style wafer, truncated circle shapes and non-symmetric and/or irregular shapes are employed in the gasket 100 and the inventive process.

In certain embodiments of the present invention, the wafer 130 further employs asymmetric tabs 132 and 134 protruding from different sides of the wafer 130, as shown in FIG. 13. The tab 132, for example, has a larger width than a width of the tab 134. The tabs 132 and 134 are formed in a shape and size complementary to the notches 128 and 126 of upper lip 122 of the gasket 100, respectively. The asymmetry of the tabs 132 and 134 may aid in identifying a desired orientation of the wafer 130 within the gasket 100. One or both of the tabs 132 and 134 of the wafer 130 may further function as a grasping or handling point of the wafer 130 distinct from the main body of the wafer 130 and/or may function as a drip point during, for example, dip coating of the wafer 130.

As shown in FIGS. 12 and 13, employing the gasket 100 having the upper lip 122 defining a shape of a hexagon and the hexagonal wafer 130, or other non-circular shapes, provides significant advantages. For example, during assembly of the casting assembly, the wafer 130 is simply loaded into the gasket 100 by placing or resting the hexagonal wafer 130 within the hexagonal space defined by the upper lip 122 of the gasket 100. In the initial position of the wafer 130 in the gasket 100, the corners of the wafer are supported on the lower lip 120 of the gasket 100 at or beneath cutouts 124 of upper lip 122. Due to the complementary shape and size of the wafer 130 and the upper lip 122 of the gasket 100, the wafer 130 may be placed within the groove 112 of the gasket 100 with little or no manipulation or distortion of the wafer 130, thereby decreasing the risk of possible damage to the wafer 130 during assembly of the casting gasket.

In order to secure the wafer 130 within the groove 112 of the gasket 100, the wafer 130 is rotated from the initial position within the groove 112. For example, as shown by comparison of FIGS. 12 and 13, the wafer 130 may be rotated clockwise within the groove 112. In this manner, the corners of the hexagonal wafer 130 are positioned within the groove 112 between the lower lip 120 and upper lip 122 of gasket 100.

Due to the difference in the generally interrupted or irregular shape, e.g. hexagonal shape, of the wafer 130 and the generally circular shape of the lower lip 120 of the gasket 100, spaces 136 are formed around a periphery of portions of the wafer 130 between the periphery of the wafer 130 and an outer periphery of the lower lip 120. The spaces 136 advantageously function, in part, to facilitate the flow of the curable casting compositions or monomers into the internal volume of the gasket 100 between the front side of the wafer 130 and the front lens mold surface.

One advantage of the casting system according to the present invention is improved mechanical properties of the wafer or laminate structure 130 over those of PVA and/or PET film. In all processing steps, the cutting, the forming, and the loading of the wafer 130 into a gasket, the greater mechanical rigidity of the wafer 130 provides operational advantages because it is less flimsy and/or less easily distorted. Loading of the wafer 130 into the gasket is less a skilled process and more accessible to lower skilled labor and/or automation. Furthermore, the handling of the wafer 130 employing increased mechanical integrity is faster and more precise. Once loaded to the gasket 100, the wafer 130 is more rigid. Hence, during the filling process, where curable casting composition or monomer is introduced into the assembled gasket 100, the monomer is filled from the back cavity and allowed to flow under gravity from there to the front (much narrower) cavity in less time.

In conventional casting processes, it is not possible to force the curable casting compositions or monomers to flow faster (under pressure) as this will distort and displace the typical, relatively flimsy film. By employing the more robust wafer 130 of the present invention, this filling process can be speeded up as a certain degree of pressure can now be withstood by the structure of the wafer 130 without significant distortion of the wafer 130 in the gasket structure.

The combination of employing the hexagonally shaped upper lip 122 of the gasket 100 and the hexagonal-shaped wafer 130 formed at least in part of a film having increased structural integrity, advantageously allows for the semi or complete automation of the insert lens casting process. For example, if the wafer 130 is formed of a relatively robust, self-supporting material or materials, automated machinery such as robots or robotic arms may be employed for picking and placing the wafer 130 into the gasket 100. A robot, for example, employs a vacuum to pick the preformed hexagonal wafer 130 up from an inventory of wafers 130, inserts the wafer 130 into the hexagonal shape defined by the upper lip 122 of the gasket 100, secures the wafer 130 within the groove 112 of the gasket 100 by rotation of the wafer 130, and releases the vacuum to release the wafer 130.

Alternatively stated, the use of a hexagon shaped wafer 130 in the casting system of the present invention allows a rotating locking method (aka Bayonet Style Fitting) to hold the wafer 130 securely in place during the mold filling and lens curing process. The hexagonal cut wafer 130 (either flat or preformed to a lens curvature) can be 'dropped' into a specific opening in the gasket 100 and rotated about a center of the wafer 130 in the range of 10 to 60 degrees, for example 30 degrees, to effectively lock in place and prevent movement of the wafer 130 within the gasket 100 during the casting process. In this way, the process is easily automated, thereby eliminating or reducing the need for skilled and time consuming labor that is necessary in traditional wafer-gasket assembly processes. The present invention is thus a significant step forward in casting technology.

In addition, it is noted that by using a hexagonal wafer 130, distortion of the wafer 130 is eliminated or at least reduced during loading into the gasket 100, as compared to known casting processes. As previously described, in traditional casting systems, the film is typically severely distorted during assembly of the casting gasket. Depending on the degree of distortion, a lens formed with the distorted wafer is increasingly likely to incorporate unacceptable flaws that lead to production inefficiencies.

The casting system of the present invention further provides at least the following advantages over known casting systems. First, the gasket 100 can be used to secure a standard round or strip style wafer without making use of the rotational hold feature. Second, the present casting system reduces contact points while maintaining structural integrity of the wafer. Third, the present casting system facilitates wafer placement in the gasket and so enables operational efficiencies. Fourth, the hexagonal, wafer 130 can be used with the more traditional round style casting gaskets. The hexagonal shape of the wafer 130 facilitates more rapid fitting of the wafer into the gasket process that traditionally requires skilled labor and significant time.

Fifth, the addition of the tabs 132 and 134 of the wafer 130, the drip/kiss feature, allows the wafer 130 to be uniformly coated in, for example, liquid cured adhesive (used to assure adhesion of a wafer to the curable composition or monomer) with no optical distortions in the main wafer surface that would otherwise impair the optical surface. The dip/kiss protrusions, the tabs 132 and 134, are shown in FIG. 13 at the 12 and 6 O'clock positions in the locked wafer position. One of tabs 132 and 134 is used for holding or handling the wafer, while the other tab is for drip removal of the liquid applied (dip coated) adhesive.

In another embodiment of the present invention, as shown in FIGS. 14-19, a cylindrical gasket 300 employs a groove 312 for insertion and securing of a wafer during lens casting. The groove 312 is formed circumferentially within an interior of the gasket 300 between an upper side 324 of a lower lip 320 and a lower side 330 of an upper lip 322 formed on an interior sidewall 302 of the gasket 300. In the present embodiment, both the lower lip 320 and upper lip 322 form substantially continuous and/or uniform protrusions from the interior sidewall 302 of the gasket 300.

The groove 312 employs a groove side wall 336 that is substantially parallel to the side of the gasket 300. The groove sidewall 336 has a height and a diameter that is dependent upon the diameter and thickness of the wafer employed for forming the cast lens. For example, for a wafer having a largest diameter or dimension of 79.5 millimeters, the groove sidewall 336 may have a diameter in the range of 80 to 81 millimeters, for example 80.5 millimeters. In other words, the diameter of the groove sidewall 336 of the gasket 300 will be slightly larger by approximately 0.2 to 0.3 millimeters than the largest diameter or dimension of the wafer employed in the respective gasket. For a wafer having a laminate or film thickness of approximately 0.6 millimeters, the grove sidewall 336 will have a height in the range of 0.2 to 1.0 millimeters, for example 0.6 millimeters.

Figure 16:
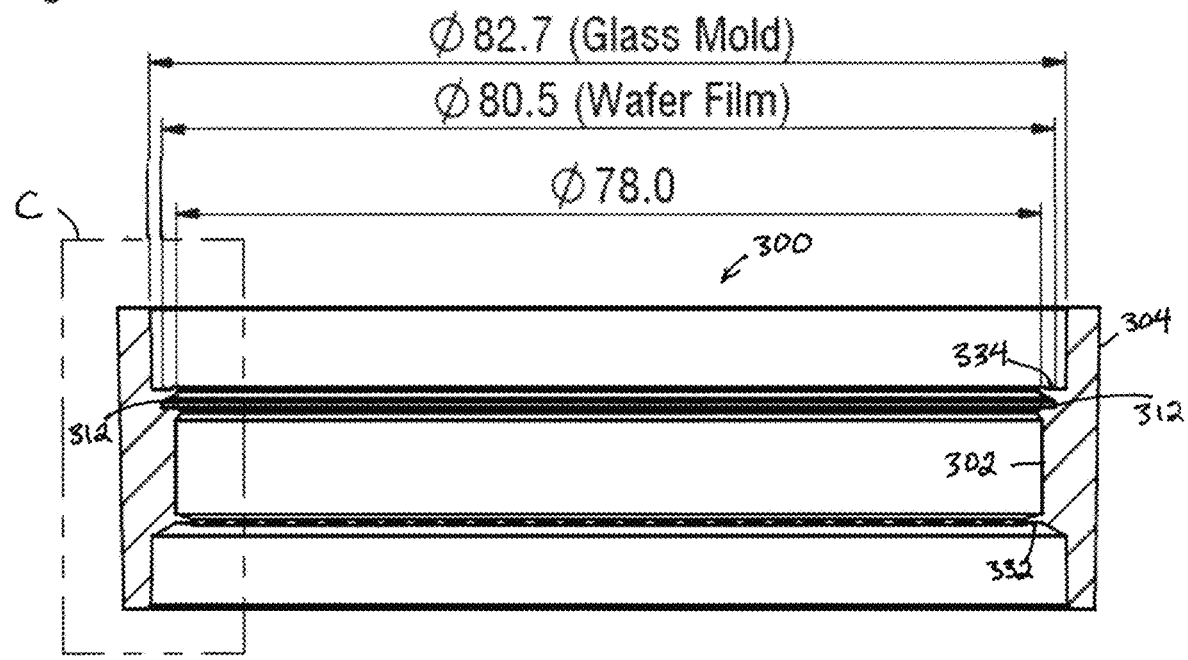
FIG. 16 is a cross-sectional view along line B shown in FIG. 15 of a lens casting gasket according to one embodiment of the present invention.
Figure 17:
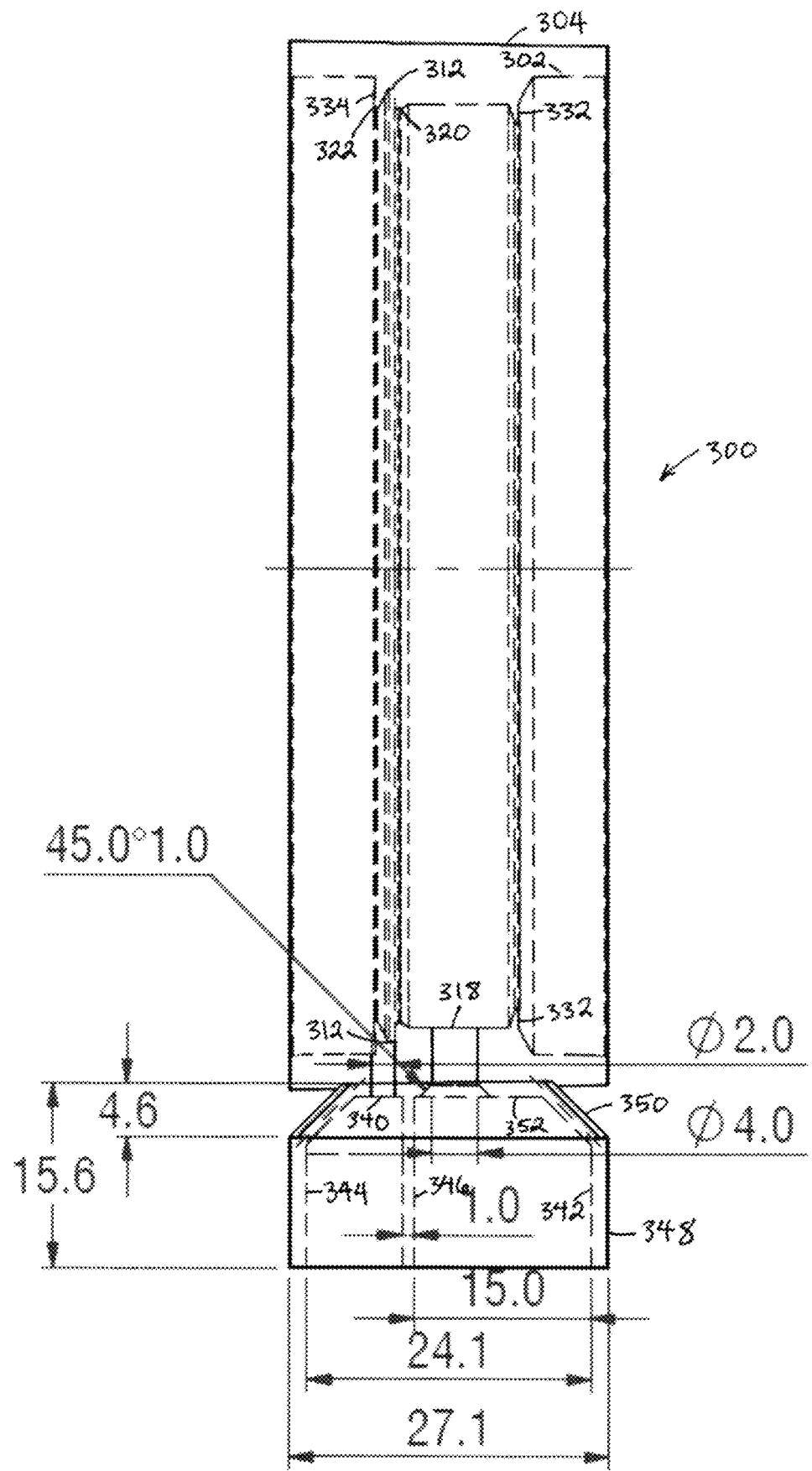
FIG. 17 is a cross-sectional view along line C shown in FIG. 15 of a lens casting gasket according to one embodiment of the present invention.
Figure 19:
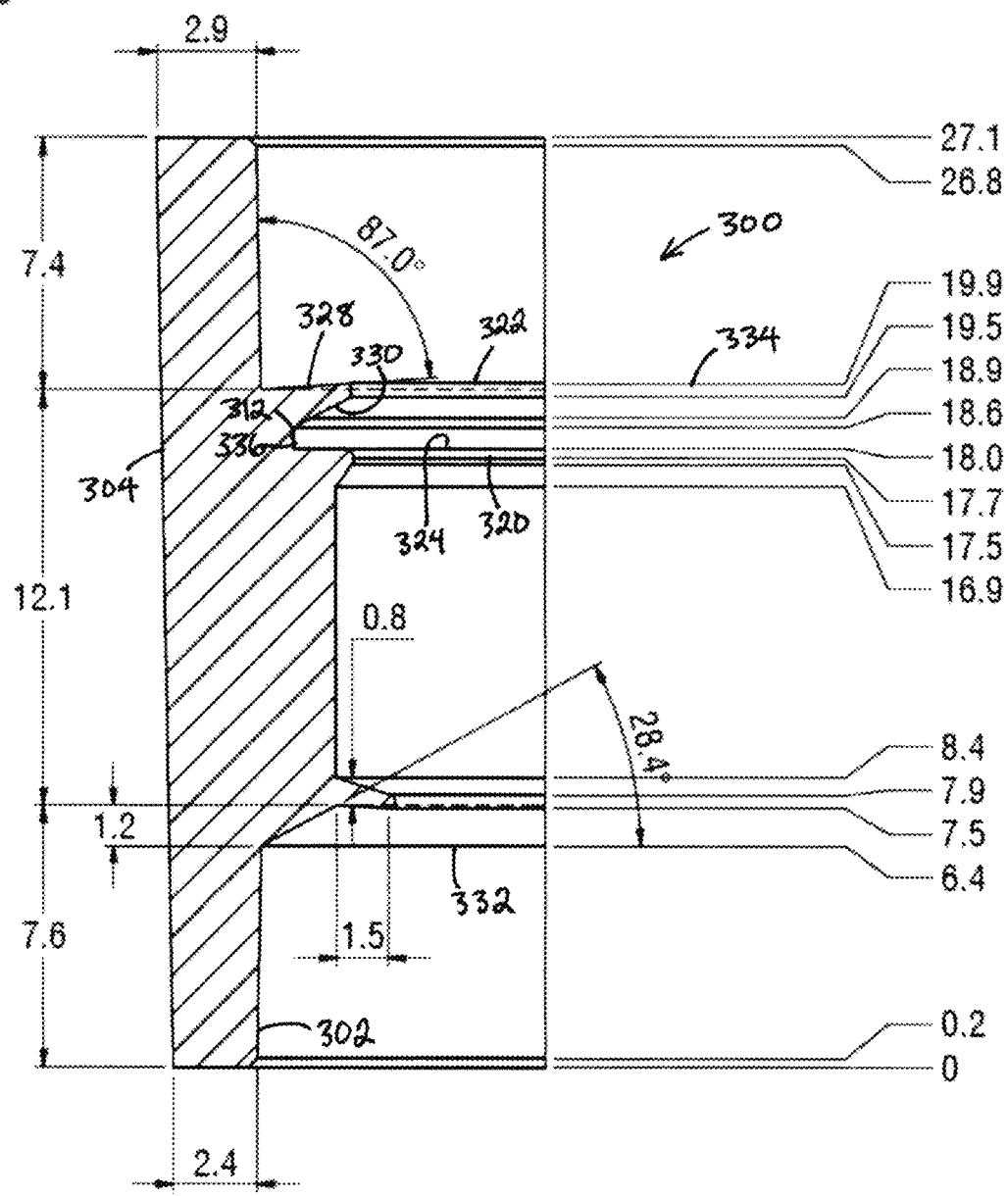
FIG. 19 is a detailed view of area C shown in FIG. 16 of a lens casting gasket according to one embodiment of the present invention.
Figure 20:
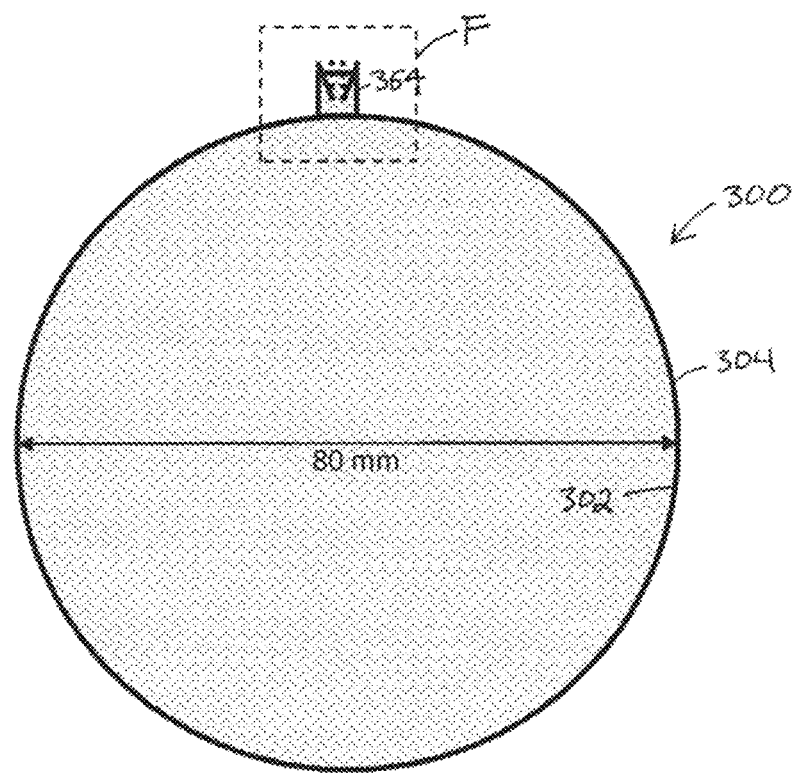
FIG. 20 is a cross-sectional view of a functional wafer secured within a lens casting gasket by rotation of the wafer within the gasket according to one embodiment of the present invention.
Figure 21:
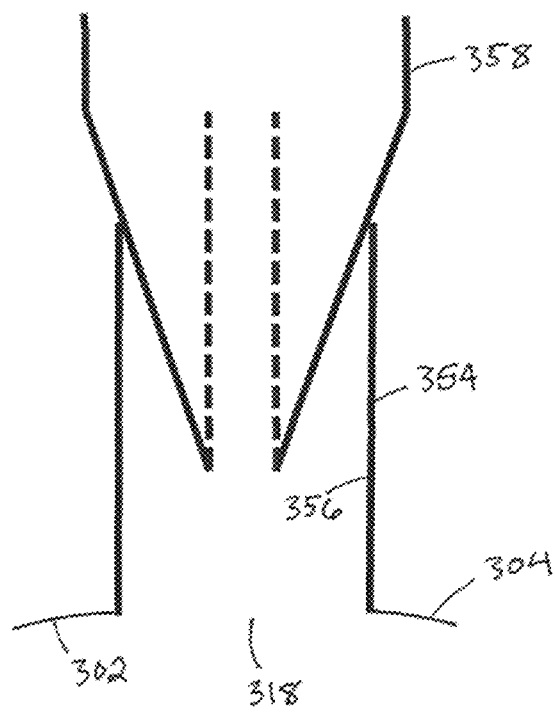
FIG. 21 is a detailed view of area F shown in FIG. 20 of a portion of a lens casting gasket according to one embodiment of the present invention.

A lower side of the upper lip 330 extends from the groove sidewall 336 at an angle in the range of 105 to 165 degrees, for example approximately 135 degrees, relative to the groove sidewall 336. The upper side 324 of a lower lip 320 extends from the groove sidewall 336 at an angle in the range of 75 to 105 degrees, for example approximately 90 degrees, relative to the groove sidewall 336. Hence, as shown in FIGS. 16, 17, and 19, the lower side of the upper lip 330 and the upper side 324 of a lower lip 320 provide the groove 312 with a tapered sidewall profile.

In most cast lens applications, the wafer employed in the groove 312 will be formed so as to have a spherical or aspherical curvature. Hence an effective thickness of the formed wafer will be greater than an actual laminate or film thickness of the wafer. In view of the above-described slightly oversized diameter of the groove sidewall 336, a formed wafer employed within groove 312 of gasket 300 is secured in place within the groove 312 primarily through a pinching or friction fit from the tapered sidewall profile of the groove 312. As described in greater detail below, depending upon the shape of the periphery of the wafer employed, all or only portions of a periphery of a wafer may be engaged in the pinching or friction fit from the tapered sidewall profile of the groove 312.

An upper side 328 of the upper lip 322 forms a front mold stop or rim 334 and an opposing stop for a back mold is formed by a back mold stop or rim 332. It will be understood that the shape of the front mold stop or rim 334 and back mold stop or rim 332 may vary depending on the corresponding shapes of the front and back molds employed in the assembled gasket 300. A back internal volume of the assembled gasket 300, i.e. a diameter and a height or dimension of the gasket between the groove 312 and the back mold stop or rim 332 will vary depending upon the configuration of the desired cask lens. For example, in certain embodiments, dimension of the gasket between the groove 312 and the back mold stop or rim 332 is in the range of 7.0 to 12.5 millimeters, for example 7.3 or 12.1 millimeters.

Figure 14:
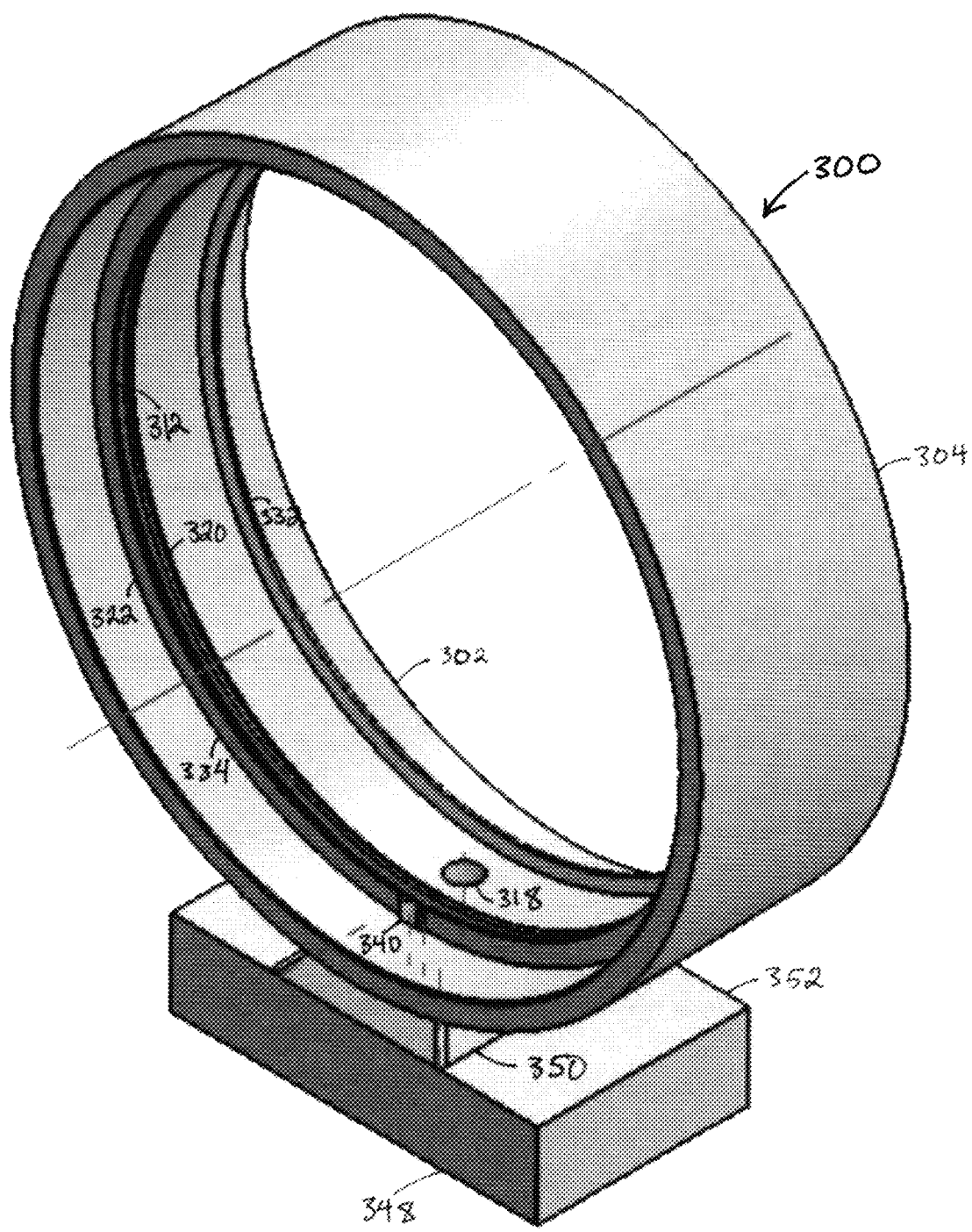
FIG. 14 is a perspective view of a lens casting gasket according to one embodiment of the present invention.
Figure 18:
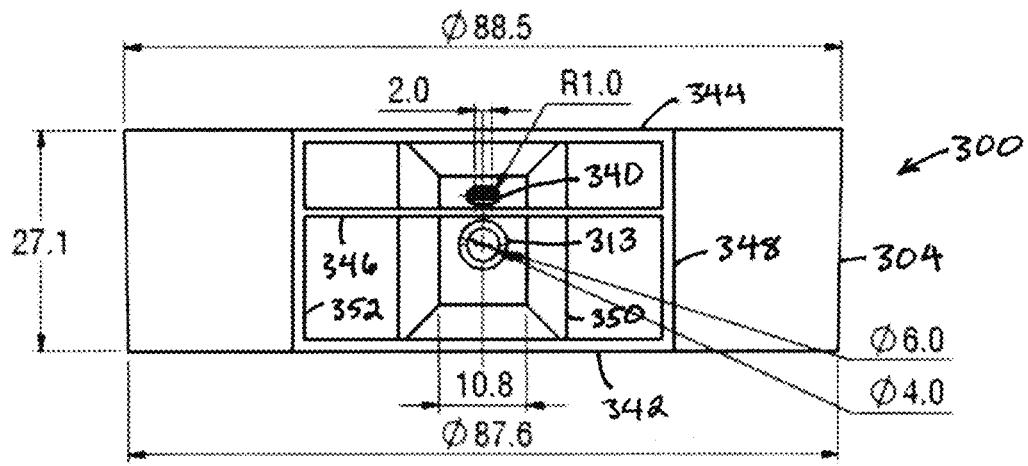
FIG. 18 is a front elevation view of a lens casting gasket according to one embodiment of the present invention.

In certain embodiments, the gasket 300 according to the present invention employs a fill port 318 and a vent port 340. As shown in FIGS. 14, 17, and 18, the fill port 318 traverses substantially perpendicularly from an exterior sidewall 304 to an interior sidewall 302 of the gasket 312 between the groove 312 and the back mold stop or rim 332. Hence, during formation of a cast lens according to the present invention, the curable casting composition or monomer will first inter and begin filling the interior volume of the assembled gasket 300 on a backside of the wafer, i.e. between the concave side of the formed wafer and the convex side of the back mold. The fill port 318 may, but need not necessarily, employ a 1.0 millimeter, 45 degree chamfered edge or entry on the exterior sidewall 304 of the gasket 300. The fill port 318 may have a generally circular or non-circular shape. A diameter or largest cross-sectional dimension of the fill port 318 is in the range of 2 to 6 millimeters, for example 4 millimeters.

As shown in FIGS. 14, 17, and 18, the vent port 340 traverses substantially perpendicularly from an exterior sidewall 304 to an interior sidewall 302 of the gasket 312 between the front mold stop or rim 334 and the upper side 324 of the lower lip 320 of the groove 312. In other words, the vent port is formed through the side of the gasket 300 at a region or point coincident, substantially coincident, or intersecting with the groove 312. Hence, the vent port 340 forms an interruption in the otherwise continuous and/or uniform protrusion of the upper lip 322 of the groove from the interior sidewall 302 of the gasket 300. The fill port 340 may have a circular or oblong, e.g. oval cross-sectional shape, having a diameter or largest cross-sectional dimension in the range of 0.5 to 6 millimeters, for example 2 or 4 millimeters.

Figure 15:
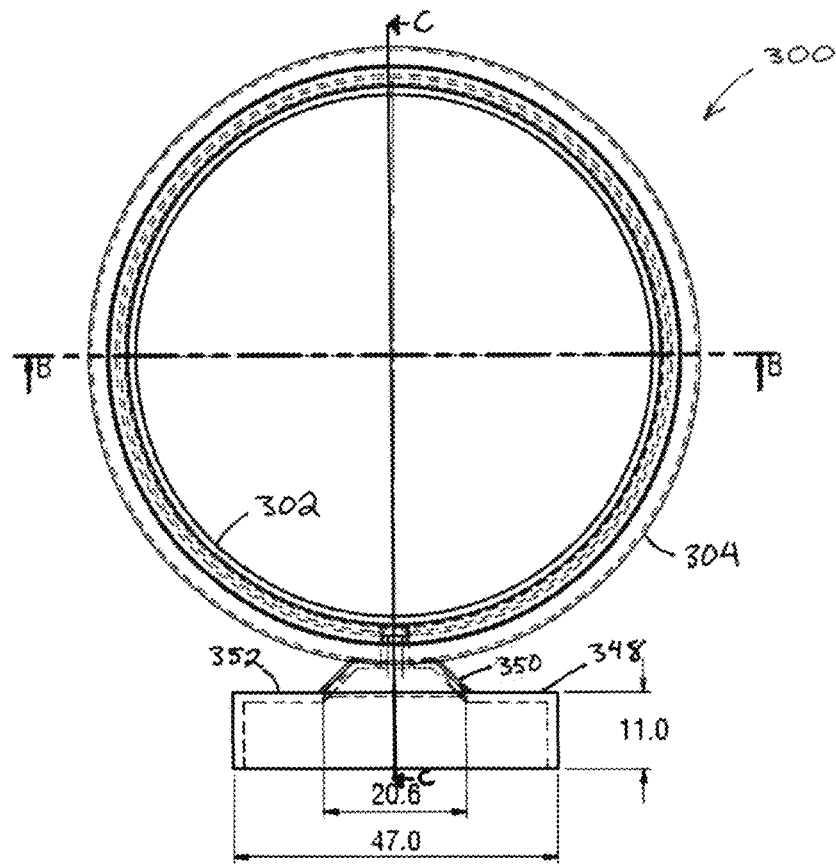
FIG. 15 is a plan view of a lens casting gasket according to one embodiment of the present invention.

In certain embodiments, the gasket 300 according to the present invention may, but need not necessarily, employ a fill port chamber 342 and/or a vent port chamber 344. The fill port chamber 342 and vent port chamber 344 may have any general form, e.g. a box-like, or cylindrical form. In certain embodiments, as shown in FIGS. 14, 15, and 17, the fill port chamber 342 and the vent port chamber 344 are formed within a common or shared structure such as a chamber box 348 and are divided from one another by a wall 346. The chamber box has dimensions in the range of: 20 to 30 millimeters, e.g. 22 or 27.1 millimeters, wide; 37 to 57 millimeters, e.g. 47 millimeters, long; and 6 to 16 millimeters, e.g. 11 millimeters high. As shown in FIGS. 14, 15, 17, and 18, in certain embodiments, the gasket and the chamber box 348 are connected to one another by a chamber manifold 350 that is formed to generally taper from the bottom 352 of the chamber box 348 to the fill port 318 and vent port 340.

The fill port chamber 342 functions to catch and/or hold excess curable casting composition or monomer that may exit a curable casting composition or monomer source nozzle and, thereby, provide for additional curable casting composition or monomer to enter the assembled gasket and compensate for shrinkage of the curable casting composition or monomer within the assembled gasket, once the gasket and source nozzle are separated. The vent port chamber 344 functions to catch and/or hold excess curable casting composition or monomer that may exit the vent port 340 upon filing of the assembled gasket and, thereby, provide for a source of curable casting composition or monomer to enter the assembled gasket and compensate for shrinkage of the curable casting composition or monomer within the assembled gasket during curing or gelling of the curable casting composition or monomer. The vent port chamber 344 also functions to prevent air from entering the gasket during the filling of the assembled gasket with the curable casting composition or monomer.

In certain embodiments of the present invention, the gasket 300 employs a fill port tube 354 that extends from the fill port 318 on the exterior sidewall 304 of the gasket 300. A fill lumen 356 of the fill port cylinder 354 has a diameter or largest cross-sectional dimension in the range of 2 to 6 millimeters, for example 4 millimeters. The diameter and or the elasticity of the material forming the fill port cylinder 354 allows the lumen 356 of the fill port cylinder 354 to receive a curable casting composition or monomer source nozzle 358 during filling of the gasket 300 with the curable casting composition or monomer. The fill port cylinder 354 has a length in the range of 5 to 15 millimeter, for example 10 millimeters. The fill port cylinder 354 functions, in part, to capture or trap gas bubbles that may form and enter the gasket as the source nozzle 358 is withdrawn from the gasket 300 during filling of the gasket with the curable casting composition or monomer. The vent port chamber 344 also functions to prevent air from entering the gasket during the filling of the assembled gasket with the curable casting composition or monomer. The fill port cylinder 354 also functions, in part, to prevent air from entering the gasket during the filling of the assembled gasket with the curable casting composition or monomer. The fill port cylinder 354 may be employed on the gasket 300 as a standalone feature extending from the fill port 318 or may be employed between the fill port chamber 342 and the fill port 318.

In certain embodiments of the present invention, the previously described gasket 100 may also employ any or all of the above-described fill and vent features, including the fill port chamber 342, the vent port chamber 344, the chamber box 348, the chamber box manifold 350, and the fill port cylinder 554.

Figure 22:
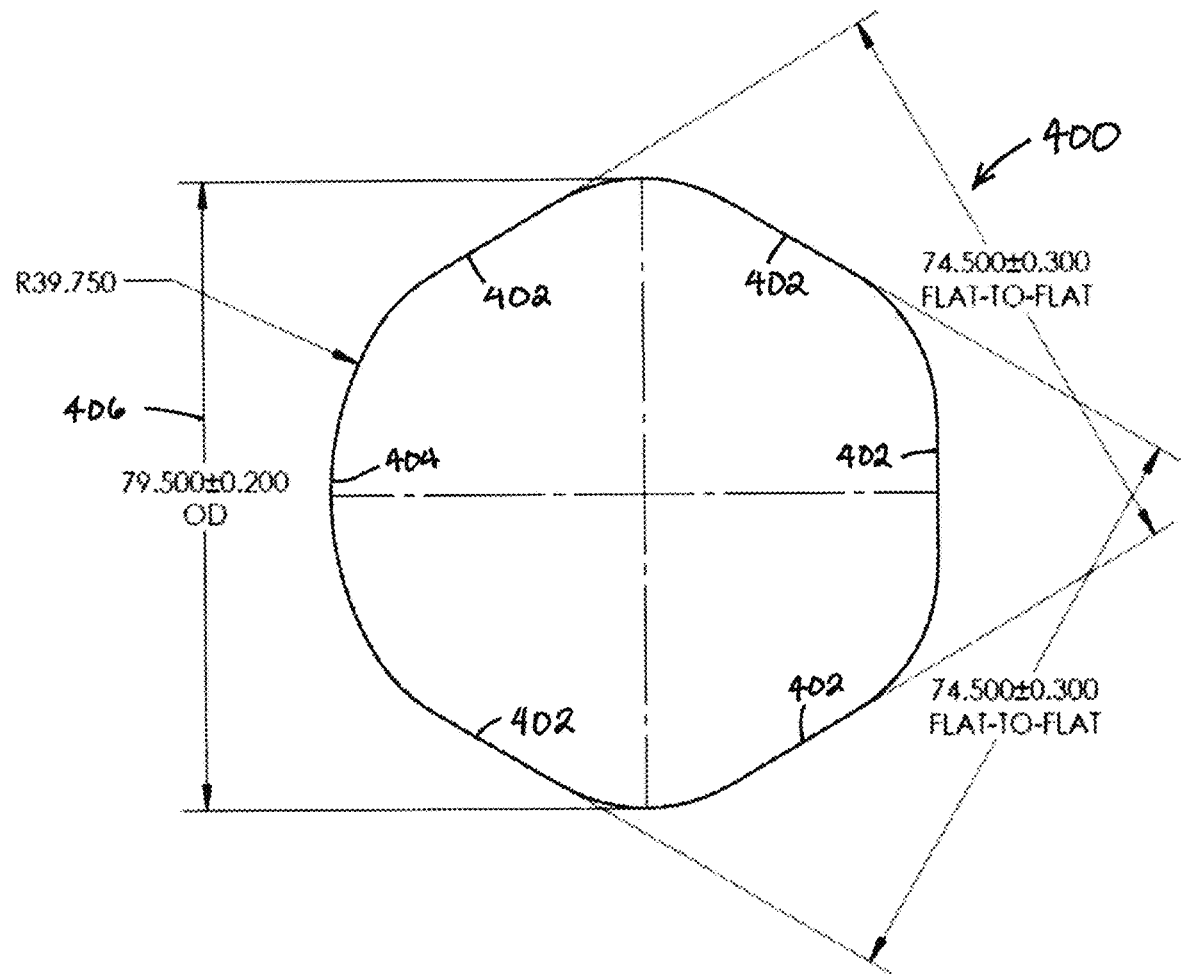
FIG. 22 is a plan view of an optically functional wafer according to one embodiment of the present invention.
Figure 23:
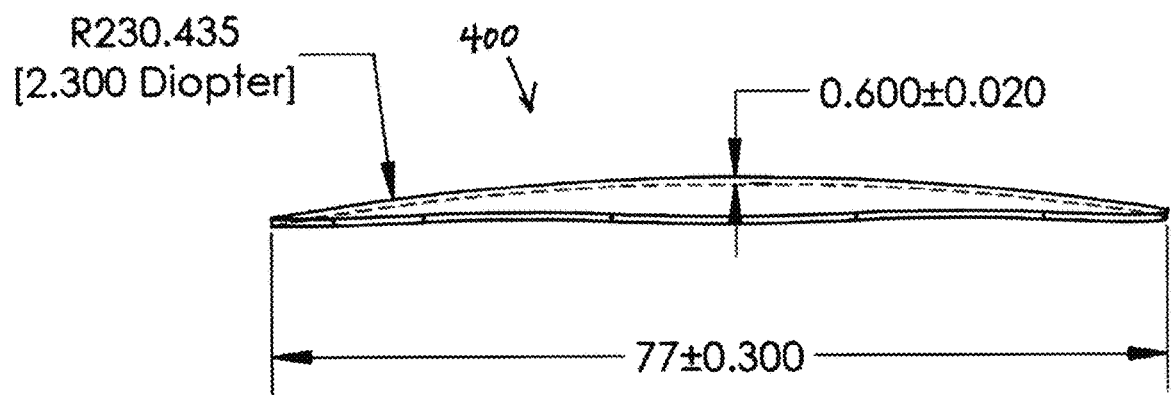
FIG. 23 is a side elevation view of an optically functional wafer according to one embodiment of the present invention.
Figure 24:
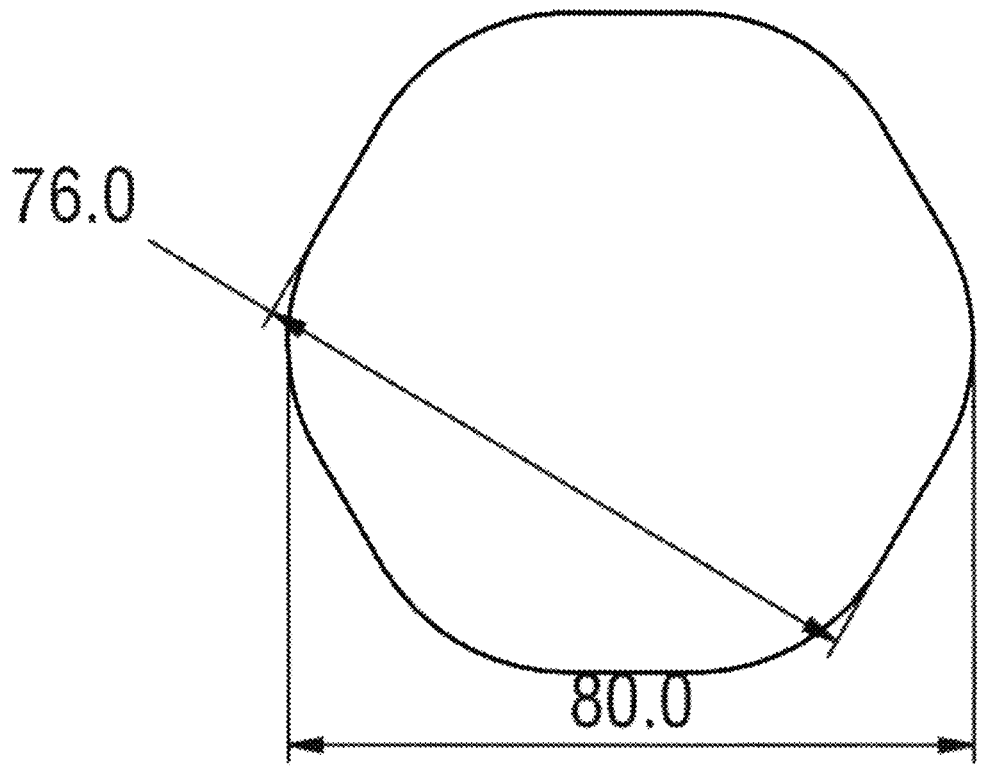
FIG. 24 is a plan view of an optically functional wafer according to one embodiment of the present invention.
Figure 25:
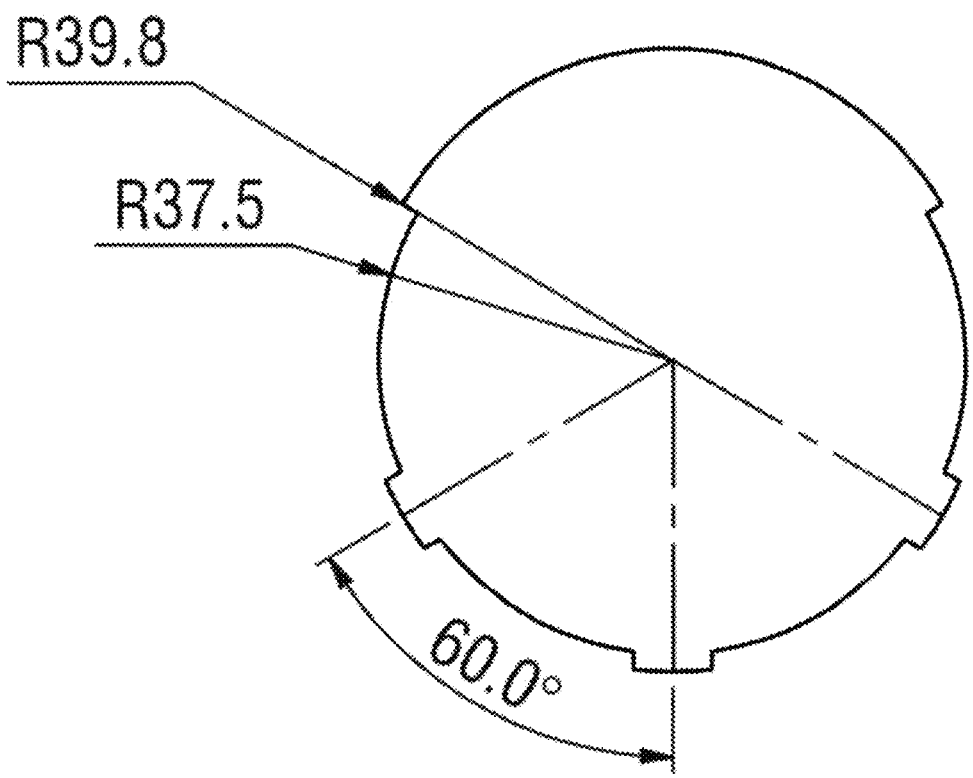
FIG. 25 is a plan view of an optically functional wafer according to one embodiment of the present invention.
Figure 26:
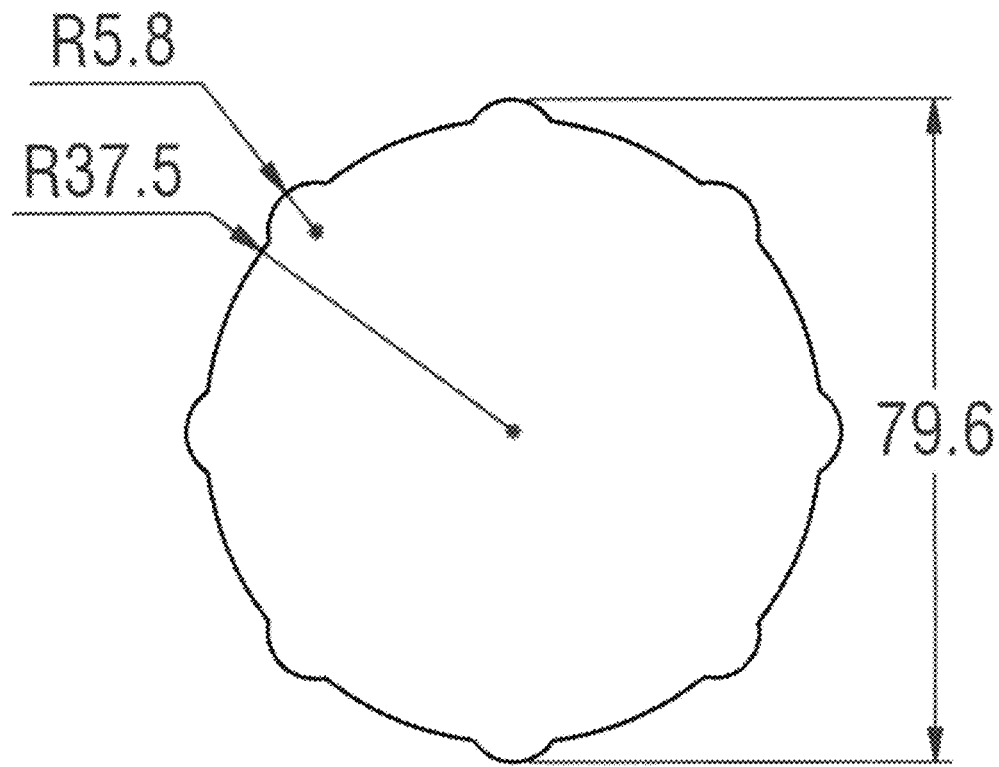
FIG. 26 is a plan view of an optically functional wafer according to one embodiment of the present invention.
Figure 27:
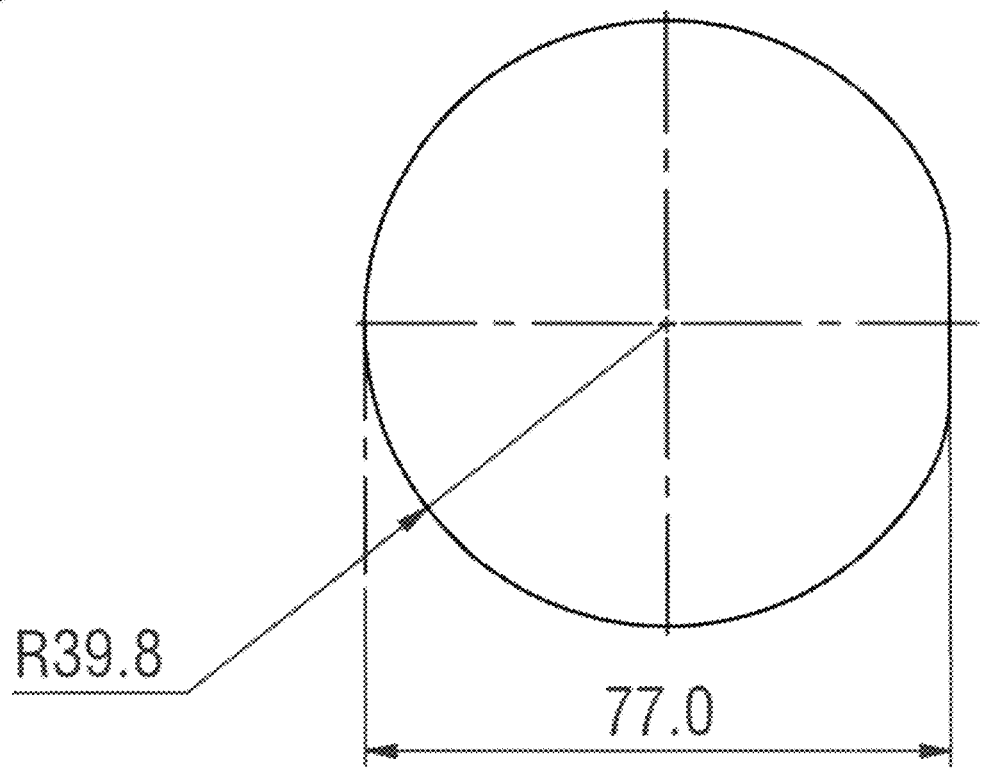
FIG. 27 is a plan view of an optically functional wafer according to one embodiment of the present invention.
Figure 28:
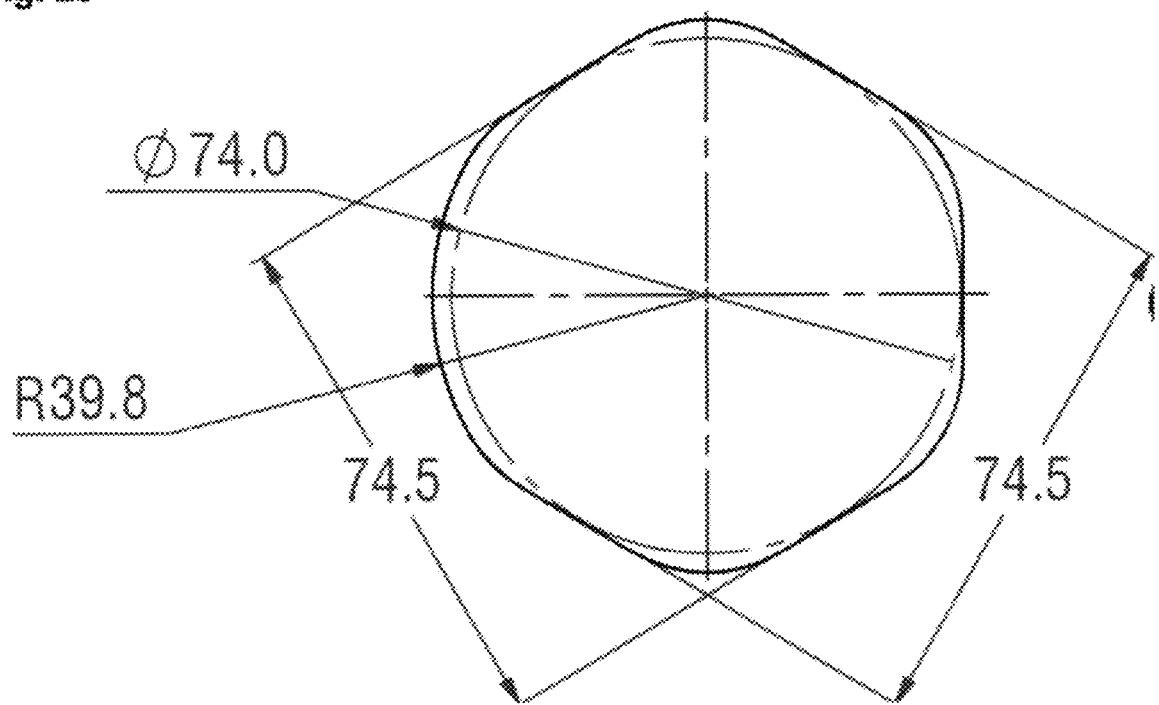
FIG. 28 is a plan view of an optically functional wafer according to one embodiment of the present invention.
Figure 29:
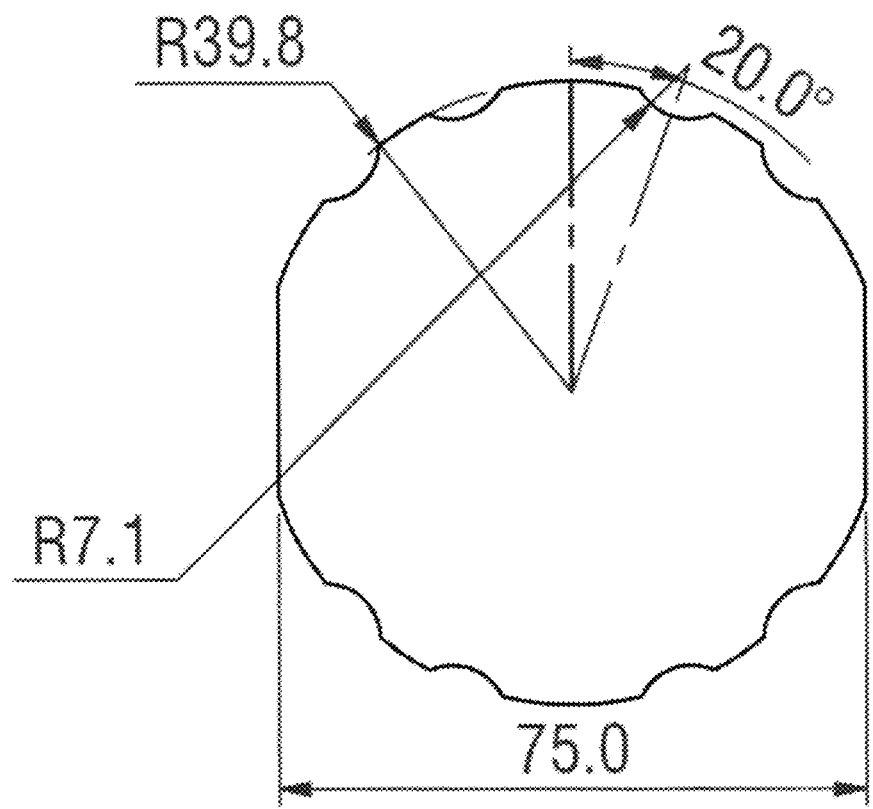
FIG. 29 is a plan view of an optically functional wafer according to one embodiment of the present invention.
Figure 30:
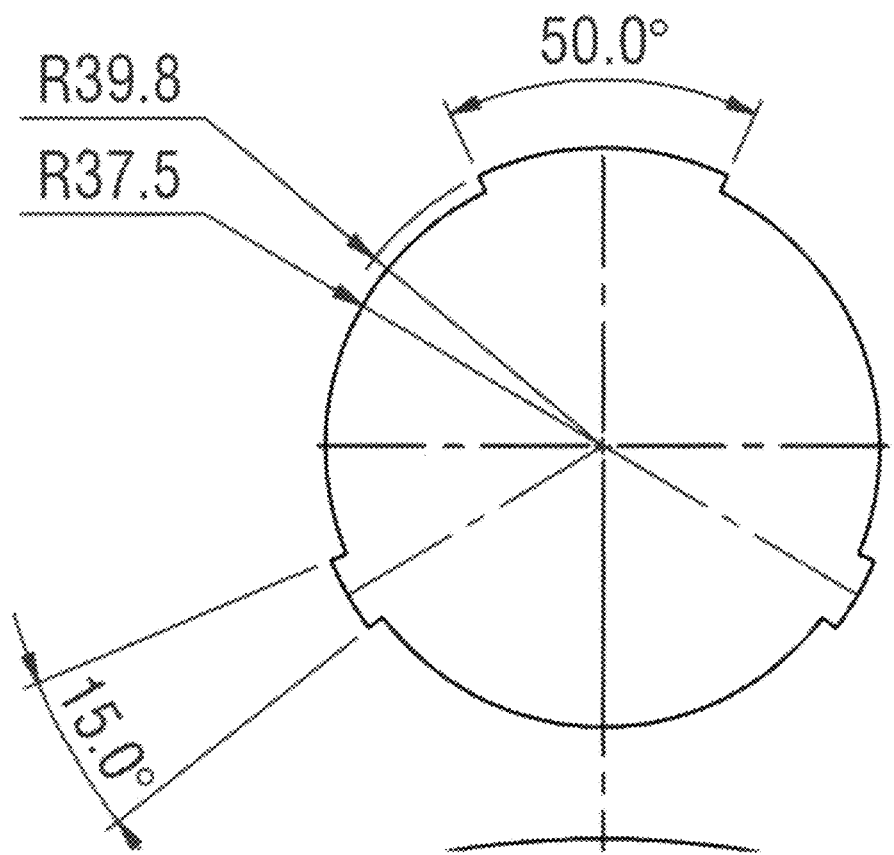
FIG. 30 is a plan view of an optically functional wafer according to one embodiment of the present invention.
Figure 31:
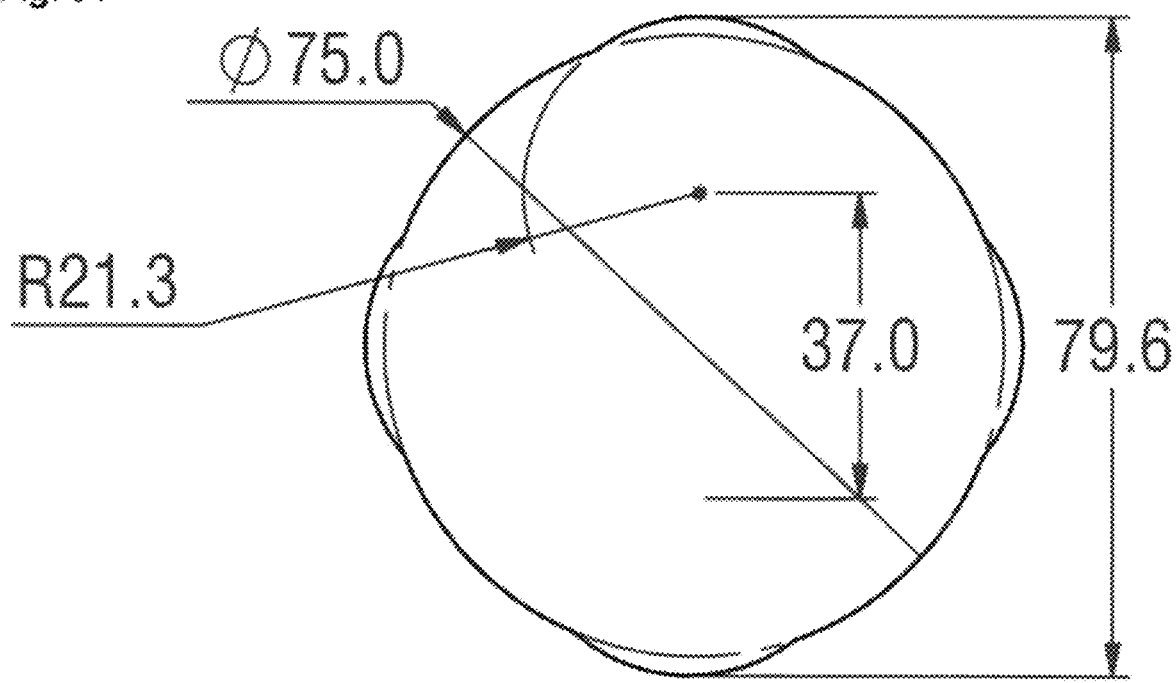
FIG. 31 is a plan view of an optically functional wafer according to one embodiment of the present invention.
Figure 32:
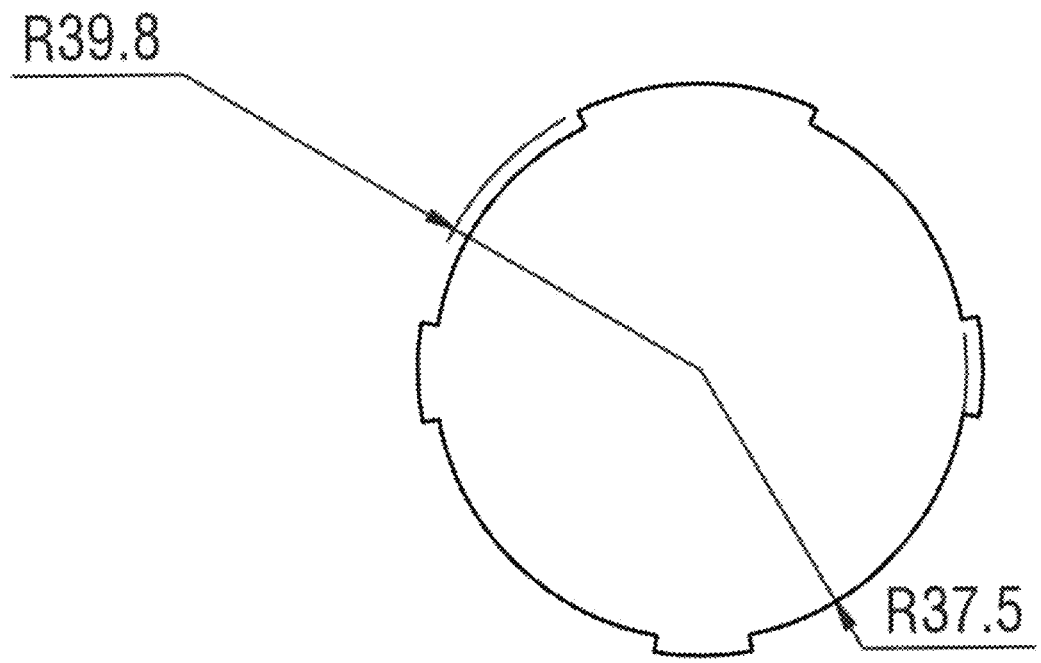
FIG. 32 is a plan view of an optically functional wafer according to one embodiment of the present invention.
Figure 33:
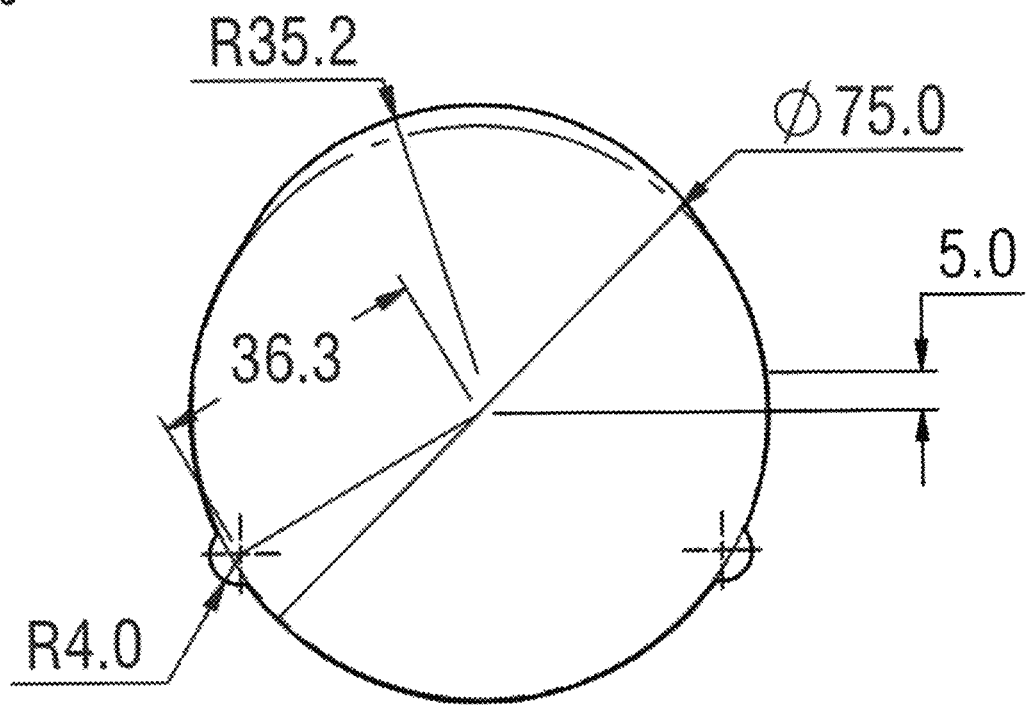
FIG. 33 is a plan view of an optically functional wafer according to one embodiment of the present invention.

In further embodiments of the present invention, wafers optimized for use with any of the above-described gaskets 100 and/or 300 are provided. In a first wafer embodiment, a wafer 400 having an irregular hexagonal shape is provided. As shown in FIGS. 22 and 23, the wafer 400 has five straight or substantially straight sides 402 and one curved or rounded side 404. The curved side 404 of the wafer 400 has a radius of, for example, 39.75 degrees. The intersections between straight sides 402 and between straight sides 402 and the curved side 404 are rounded. The wafer 400 has a largest dimension or diameter 406, for example, of 79.5 plus or minus 0.2 millimeters and a dimension between opposite straight sides 404 of, for example, 74.5 plus or minus 0.3 millimeters. In certain embodiments, the wafer 400 has a laminate or film thickness of approximately 0.6 plus or minus 0.3 millimeters. In certain embodiments, once the wafer 400 has been formed to a diopter of, for example, 2.3, the diameter 406 of the wafer 400 is, for example, 77 plus or minus 0.3 millimeters.

When used in the gasket 300, the curved side 304 of the wafer 400 is positioned against the vent port 340. In this orientation, the straight sides 402 provide gaps or holes between a periphery of the wafer 400 and the groove 312 of the gasket 300 that allow for passage of the curable casting composition or monomer from the back of the wafer, where the fill port 318 is located, to the interior volume of the gasket between the front, convex side of the wafer 400 and the concave side of the front mold. The positioning of the curved side 304 of the wafer 400 against the vent port 340 advantageously provides improved venting or evacuation of gas from the interior of the gasket 300 during filling of the gasket 300 with the curable casting composition or monomer.

In a method employing the gasket 300 and the wafer 400, or any of the other above and below described wafers of the present invention, an operator first inserts, for example, the optically functional wafer 300 into the groove 312 such that the curved side 404 abuts or covers the vent port 340 of the gasket 300. Next, the operator inserts the front and back molds into their respective positions against the front mold stop 334 and back mold stop 332 of the gasket 300. The operator then engages the source nozzle 358 with the fill port 318, for example, by insertion of the source nozzle 358 into the lumen 356 of the fill port cylinder 354 or by directly inserting the source nozzle 358 into the fill port 318, and begins filling the interior of the assembled gasket with the curable casting composition or monomer. In view of the position of the fill port 318 on the backside of the wafer 300, the interior volume of the gasket between the back mold and the backside of the wafer 300 begins to fill first. As the content of the curable casting composition or monomer increases, the curable casting composition or monomer begins to flow around the periphery of the wafer 300 into the interior volume of the gasket formed between the front mold and the front of the wafer 300.

Due to this sequential filling and the novel position of vent port 340 coincident with the groove 312, air or gas displace from within the assembled gasket by the curable casting composition or monomer is efficiently forced out the vent port 312 and not trapped within the assembled gasket 300. Once the assembled gasket is filled with the curable casting composition or monomer, the operator disengages the source nozzle 358 from the fill port 318 and proceeds with allowing the curable casting composition or monomer within the gasket to gel and fully cure, e.g. with the application of heat or ultraviolet radiation.

In certain embodiments of the casting system of the present invention, the optically functional wafers employed in the gasket 100 and/or 300 during formation of a cast lens are formed of one or more layers of a transparent thin film having structural integrity approximately equal to or greater than the structural integrity of, for example, known PVA based wafers. The optically functional wafers employed in the gaskets of the present invention during formation of cast lenses are, for example, formed of one or more layers of polycarbonate, polyester, polyethylene terephthalate, triacetate or cellulose triacetate, or combinations thereof. The optically functional wafers employed in the gaskets of the present invention during formation of cast lenses have a thickness of 3 to 0.1 millimeters, for example 2.0 millimeters, 1.0 millimeters, 0.5 millimeters, or 0.6 millimeters.

In certain embodiments of the present invention, prior to being employed in the casting process of the present invention, a wafer may be treated or coated to impart additional characteristics or optical functionality or to impart chemical resistance to the curable casting composition or monomer. For example, when a wafer is formed with one or more thin films or layers of polycarbonate, a hard coating may be applied to the surface or surfaces of the polycarbonate that will be in direct contact with the curable casting composition or monomer. Such a hard coating functions to protect the polycarbonate from chemical attack by the casting monomer and/or function as an adhesive. Alternatively, or additionally, the wafer may be coated with a water-based, aliphatic polycarbonate polyurethane dispersion (PUD) adhesive layer, for example, PU400 (Stahl Polymer). Additional details relating to such wafers and treatments thereof are disclosed in the Assignee's U.S. patent application Ser. No. 13/741,290, the contents of which are herein incorporated by reference.

As used in the present disclosure, the term optically functional wafer is intended to mean single layer thin film wafers or multilayer thin film laminate wafers including an optically functional characteristic. Optically functional characteristics or properties include light or other radiation filtering or attenuation, cosmetic, and/or durability features incorporated into an optical lens to impart or modify lens characteristics other than optical power or magnification characteristics. Non-limiting examples of specific functional characteristics or properties include light polarization, photochromism, electochromism, tint, color, hardness, chemical resistance, and reflectance.

FIGS. 24 through 32 show alternative embodiments of functional wafers according to the present invention. In FIGS. 24 through 32, the designation "R" indicates that the immediately following numeric value is a radius of the indicated portion of the wafer. Each of the wafers shown in FIGS. 24-32 employs at least two distinct portions. A first portion defined by at least a first continuous curve having a first radius and a second portion formed of at least a straight line or a curve having a second radius distinct from the first radius of the first portion.

In certain embodiments of the present invention, the above-described casting gaskets and wafers are employed to form cast lenses formed of curable casting compositions or monomers and, more particularly, are formed of a composition employing a liquid monomer mixture or a urethane based polymeric composition. Such materials include, but are not limited to, polymers based on allyl diglycol carbonate monomers (e.g. CR-39 available from PPG Industries, Inc.; MR series monomers from Mitsui chemicals based on polyisocyanate poly thiol monomers (MR-7, MR-10, MR-95, MR174 etc.)); urethane based prepolymer compositions (e.g. Trivex, PPG); and polycarbonates (e.g. LEXAN available from General Electric Co.).

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An optical lens mold gasket comprising:
   a gasket body;
   a groove disposed on an internal surface of said body, said groove sized for holding a wafer;
   a vent port formed between an exterior side wall and an interior sidewall of said body and intersecting said groove; and,
   a fill port on said body spaced from said groove and configured to direct a flow of mold material to one side of a wafer before said mold material flows to an opposite side of said wafer.

2. An optical lens mold gasket according to claim 1 wherein said fill port is formed through a sidewall of said gasket body between said groove and a back mold stop.

3. An optical lens mold gasket according to claim 1 wherein said groove is tapered.

4. An optical lens mold gasket according to claim 1 wherein said fill port comprises a tubular element extending from an exterior surface of said gasket body.

5. An optical lens mold gasket according to claim 1 further comprising a chamber in fluid communication with said vent port formed on an exterior of said gasket body.

6. An optical lens mold system comprising:
   a mold;
   a gasket associated with said mold;
   a wafer associated said mold;
   said gasket comprising:
     a body;

a groove having an upper lip comprising at least one interrupted protrusion formed on an interior surface of the body and sized to receive said wafer and;

a fill port in a sidewall of said body;

said wafer shaped such that at least one space is created between a periphery of said wafer and a surface of said groove when said wafer is received in said groove;

said wafer forming a first and second cavity in said mold on opposite sides of said wafer, respectively, when said wafer is received in said groove; and, said fill port being positioned on said sidewall of said body such that mold material introduced to said fill port is directed to said first cavity before flowing through said at least one space to said second cavity.

7. An optical lens mold system according to claim 6 wherein said wafer comprises an optical functional property selected from a group consisting of: polarization, photochromism, tint, color, hardness, chemical resistance, and reflectance.

8. An optical lens mold system according to claim 6 wherein said shape of said wafer in non-circular.

9. An optical lens mold system according to claim 6 wherein said gasket further comprises a vent port formed through a sidewall of said body, said vent port intersecting said groove.

10. An optical lens mold system according to claim 9 wherein the fill port and the vent port are axially spaced apart from each other.

11. An optical lens mold system according to claim 6 wherein said wafer is shaped to create multiple spaces between a periphery of said wafer and a surface of said groove when said wafer is received in said groove.

12. An optical lens mold system according to claim 6 wherein said fill port and said at least one space are configured so that mold material enters said second cavity exclusively through said at least one space.

13. A method of casting a lens comprising:

placing a wafer into a groove of a gasket associated with a mold such that the wafer forms a front cavity and a back cavity inside the gasket;

orienting the wafer into the groove such that the wafer is positioned against a vent port formed between an exterior side wall and an interior sidewall of the gasket and intersecting the groove;

introducing flowable lens material initially into said back cavity and not initially into said front cavity;

venting air from said front and back cavity during introduction of said flowable lens material initially into said back cavity.

14. The method of claim 13 further comprising directing said flowable lens material into said front cavity after said back cavity is substantially full through at least one space between said wafer and said mold.

15. The method of claim 14 further comprising directing said flowable lens material through a single space between said wafer and said mold.

16. The method of claim 14 wherein placing a wafer into a mold comprises placing a wafer having a non-circular periphery into said mold.

17. The method of claim 16 wherein said non-circular periphery of said wafer is received in a groove of said mold and thereby creates said at least one space between said wafer and said mold.

18. The method of claim 13 wherein said venting occurs at a location axially spaced from where said introducing of said flowable lens material occurs.

19. The method of claim 13 wherein said venting occurs through a vent port in said gasket.

* * * * *